(12) United States Patent
Kajiwara

(10) Patent No.: US 7,013,050 B2
(45) Date of Patent: Mar. 14, 2006

(54) IMAGE ENCODING APPARATUS AND METHOD, PROGRAM CODE, AND STORAGE MEDIUM

(75) Inventor: Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 10/176,583

(22) Filed: Jun. 24, 2002

(65) Prior Publication Data

US 2003/0007561 A1 Jan. 9, 2003

(30) Foreign Application Priority Data

Jun. 26, 2001 (JP) ............................. 2001-193559
Jul. 31, 2001 (JP) ............................. 2001-232812

(51) Int. Cl.
*G06K 9/36* (2006.01)
*G06K 9/46* (2006.01)

(52) U.S. Cl. ...................................... 382/240; 382/246
(58) Field of Classification Search ................ 382/128, 382/240; 348/244–248, 398.1, 408.1; 375/240.19, 375/408.1, 120.19, 240.25

See application file for complete search history.

(56) References Cited

U.S. PATENT DOCUMENTS

| | | | |
|---|---|---|---|
| 5,945,930 A | 8/1999 | Kajiwara | 341/50 |
| 6,028,963 A | 2/2000 | Kajiwara | 382/239 |
| 6,031,938 A | 2/2000 | Kajiwara | 382/239 |
| 6,101,282 A | 8/2000 | Hirabayashi et al. | 382/426 |
| 6,233,355 B1 | 5/2001 | Kajiwara | 382/238 |
| 6,310,980 B1 | 10/2001 | Kajiwara | 382/238 |

*Primary Examiner*—Duy M. Dang
(74) *Attorney, Agent, or Firm*—Fitzpatrick, Cella, Harper & Scinto

(57) ABSTRACT

Image data is decomposed into subbands and quantized by a discrete wavelet transformer (102) and coefficient quantizer (103). On the other hand, a high-resolution region information input unit (105) inputs region designation information H(x, y) that designates a region which requires a high resolution, and a mask generator (106) obtains, based on H(x, y), mask information M(S, x, y) indicating if coefficients of HL2, LH2, and HH2 are generated with reference to pixels of the high-resolution region. A coefficient correction unit (104) corrects the quantized coefficients of respective subbands with reference to M(S, x, y) if subband S is one of HL2, LH2, and HH2, and does not correct if subband S is other than HL2, LH2, and HH2.

45 Claims, 15 Drawing Sheets

IMAGE TO BE ENCODED

IMAGE TO BE ENCODED

IMAGE TO BE ENCODED

IMAGE ENCODING APPARATUS AND METHOD, PROGRAM CODE, AND STORAGE MEDIUM

FIELD OF THE INVENTION

The present invention relates to an image encoding apparatus and method for encoding image data, a program, and a storage medium.

BACKGROUND OF THE INVENTION

In recent years, as the technologies for image input apparatuses such as digital cameras, scanners, and the like have improved, the resolution of image data captured by such input apparatus is increasing. A low-resolution image requires only a small image data size and never disturbs transfer and storage processes. However, the image data size becomes huge with increasing resolution, thus requiring a long transfer time and a large storage size.

Hence, upon transferring or storing an image, it is a common practice to remove redundancy of an image or to reduce the data size by processing an image within a visibly allowable range using high-efficiency coding. A coding scheme that can perfectly reconstruct an original image by decoding is called lossless coding, and a coding scheme which can obtain a visibly approximate image, but cannot perfectly reconstruct an original image is called lossy coding. In case of lossy coding, it is important to reduce the code size by changing a portion where slight deterioration is visibly inconspicuous, but such process largely depends on the characteristics of images. Image data includes various types: a natural image generated by taking a silver halide photo of a person, landscape, or the like, and scanning the photo using a scanner, or directly taking such object photo by a digital camera, a text/line image obtained by rasterizing text/line information, a CG image obtained by rendering two-dimensional image data or a three-dimensional shape generated by a computer, and the like. In order to obtain high reproduced image quality, the required resolution and the required number of gray levels vary depending on such image types. In general, a text/line image requires a higher resolution than a natural image.

As one conventional scheme of high-efficiency coding, a method using wavelet transformation is used. In the conventional scheme, an image to be encoded is decomposed into a plurality of frequency bands (subbands) using discrete wavelet transformation. Transform coefficients of respective subbands undergo quantization and entropy coding by various methods to generate a code sequence. As a wavelet transformation method of an image, as shown in FIGS. 4A, 4B, and 4C that show its processes, an image to be encoded (FIG. 4A) undergoes a one-dimensional transformation process in the horizontal and vertical directions to be decomposed into four subbands. Furthermore, a method of repetitively decomposing only a low-frequency subband (LL subband) is normally used. FIG. 5 shows an example of subbands obtained when one-dimensional transformation is repeated twice.

As one of merits of image coding using wavelet transformation, scalable decoding of spatial resolutions is easy to implement. When wavelet transformation is done, as shown in FIG. 5, and coefficients of respective subbands are encoded and transferred in turn from low-frequency subband LL toward high-frequency subband HH2, the decoding side can decode images while gradually increasing resolution, i.e., a reconstructed image of ¼ resolution upon receiving coefficients of LL subband, that of ½ resolution upon receiving LL, LH1, HL1, and HH1, and that of an original resolution upon additionally receiving LH2, HL2, and HH2.

However, the aforementioned conventional high-efficiency coding method is not so efficient since it does not consider that different resolutions are required to obtain a high-quality natural image and text/line image upon encoding image data that includes both a natural image and text/line image.

When an image includes portions having different required resolutions like in a text/photo mixed image, data required to decode high resolution for only a required region is encoded, and data required to decode high resolution for a region that does not require high resolution is discarded, using scalability of spatial resolution of wavelet transformation.

However, the aforementioned conventional high-efficiency coding method is not so efficient, since image data must be temporarily scanned at high resolution upon encoding image data which includes regions having different required resolutions such as an image that includes both a natural image and text/line image.

The present invention has been made in consideration of the aforementioned problems, and has as its object to implement efficient image coding upon encoding image data that include regions which require different resolution levels.

It is another object of the present invention to make encoding that generates a code sequence, which allows the decoding side to specify a resolution of interest early upon decoding encoded image data.

SUMMARY OF THE INVENTION

In order to achieve the object of the present invention, an image encoding apparatus of the present invention characterized by comprising:

region information generation means for generating region information which indicates a region of the image, that requires decoding at a higher resolution than other regions;

frequency transformation means for generating coefficients for respective subband by frequency transformation of the image;

correction means for correcting, in accordance with the region information, coefficients which form a subband included in a predetermined high-frequency component of the subbands generated by the frequency transformation means or quantized values of the coefficients; and encoding means for encoding the coefficients or quantized values of the coefficients, including those corrected coefficients by the correction means to generate a code sequence.

In order to achieve the object of the present invention, an image encoding apparatus of the present invention characterized by comprising:

division means for dividing the image into tiles each having a predetermined size;

frequency transformation means for generating coefficients for respective subbands of a tile, divided by the division means, by frequency transformation of the tile;

discrimination means for generating a discrimination result indicating if each of the tiles divided by the division means includes a specific region;

correction means for correcting, in accordance with the discrimination result of the discrimination means, coefficients which form a subband included in a predetermined high-frequency component of the subbands generated by the frequency transformation means or quantized values of the coefficients; and encoding means for encoding the coefficients or quantized values of the coefficients, including those corrected coefficients by the correction means to generate a code sequence.

In order to achieve the object of the present invention, an image encoding apparatus of the present invention characterized by comprising:

division means for dividing the image into tiles each having a predetermined size;

discrimination means for generating a discrimination result indicating if each of the tiles divided by the division means includes a specific region;

frequency transformation means for generating coefficients for respective subbands of a tile, divided by the division means, by frequency transform of the tile using a filter according to the discrimination result of the discrimination means;

correction means for correcting, in accordance with the discrimination result of the discrimination means, coefficients which form a subband included in a predetermined high-frequency component of the subbands generated by the frequency transformation means or quantized values of the coefficients; and encoding means for encoding the coefficients or quantized values of the coefficients, including those corrected coefficients by the correction means to generate a code sequence.

In order to achieve the object of the present invention, an image encoding method of the present invention characterized by comprising:

the region information generation step of generating region information which indicates a region of the image, that requires decoding at a higher resolution than other regions;

the frequency transformation step of generating coefficients for respective subband by frequency transformation of the image;

the correction step of correcting, in accordance with the region information, coefficients which form a subband included in a predetermined high-frequency component of the subbands generated in the frequency transformation step or quantized values of the coefficients; and the encoding step of encoding the coefficients or quantized values of the coefficients, including those corrected coefficients in the correction step to generate a code sequence.

the division step of dividing the image into tiles each having a predetermined size;

frequency transformation step of generating coefficients for respective subbands of a tile, divided in the division step, by frequency transformation of the tile;

the discrimination step of generating a discrimination result indicating if each of the tiles divided in the division step includes a specific region;

the correction step of correcting, in accordance with the discrimination result of the discrimination step, coefficients which form a subband included in a predetermined high-frequency component of the subbands generated in the frequency transformation step or quantized values of the coefficients; and the encoding step of encoding the coefficients or quantized values of the coefficients, including those corrected coefficients in the correction step to generate a code sequence.

In order to achieve the object of the present invention, an image encoding method of the present invention characterized by comprising:

the division step of dividing the image into tiles each having a predetermined size;

frequency transformation step of generating coefficients for respective subbands of a tile, divided in the division step, by frequency transformation of the tile;

the discrimination step of generating a discrimination result indicating if each of the tiles divided in the division step includes a specific region;

the correction step of correcting, in accordance with the discrimination result of the discrimination step, coefficients which form a subband included in a predetermined high-frequency component of the subbands generated in the frequency transformation step or quantized values of the coefficients; and the encoding step of encoding the coefficients or quantized values of the coefficients, including those corrected coefficients in the correction step to generate a code sequence.

In order to achieve the object of the present invention, an image encoding method of the present invention characterized by comprising:

the division step of dividing the image into tiles each having a predetermined size;

the discrimination step of generating a discrimination result indicating if each of the tiles divided in the division step includes a specific region;

the frequency transformation step of generating coefficients for respective subbands of a tile, divided in the division step, by frequency transform of the tile using a filter according to the discrimination result of the discrimination step;

the correction step of correcting, in accordance with the discrimination result of the discrimination step, coefficients which form a subband included in a predetermined high-frequency component of the subbands generated in the frequency transformation step or quantized values of the coefficients; and the encoding step of encoding the coefficients or quantized values of the coefficients, including those corrected coefficients in the correction step to generate a code sequence.

In order to achieve the object of the present invention, an image encoding apparatus of the present invention characterized by comprising:

first scan means for scanning a first region of an original image at a first resolution to generate a first image including the scanned region;

second scan means for scanning a second region different from the first region at a second resolution higher than the first resolution to generate a second image including the scanned region;

first frequency transformation means for generating coefficients for respective subbands, by frequency transformation of the second image;

multiplexing means for multiplexing the first image in a predetermined one of a plurality of subbands obtained by the first frequency transformation means to generate a multiplexed subband;

second frequency transformation means for further generating coefficients for respective subbands, by frequency transformation of the multiplexed subband; and code sequence generation means for generating a code sequence on the basis of the coefficients of the subbands obtained by the first and second frequency transformation means.

In order to achieve the object of the present invention, an image encoding method of the present invention characterized by comprising:

the first scan step of scanning a first region of an original image at a first resolution to generate a first image including the scanned region;

the second scan step of scanning a second region different from the first region at a second resolution higher than the first resolution to generate a second image including the scanned region;

the first frequency transformation step of generating coefficients for respective subbands, by frequency transformation of the second image;

the multiplexing step of multiplexing the first image in a predetermined one of a plurality of subbands obtained in the first frequency transformation step to generate a multiplexed subband;

the second frequency transformation step of further generating coefficients for respective subbands, by frequency transformation of the multiplexed subband; and the code sequence generation step of generating a code sequence on the basis of the coefficients of the subbands obtained in the first and second frequency transformation steps.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

FIRST EMBODIMENT

Figure 1:
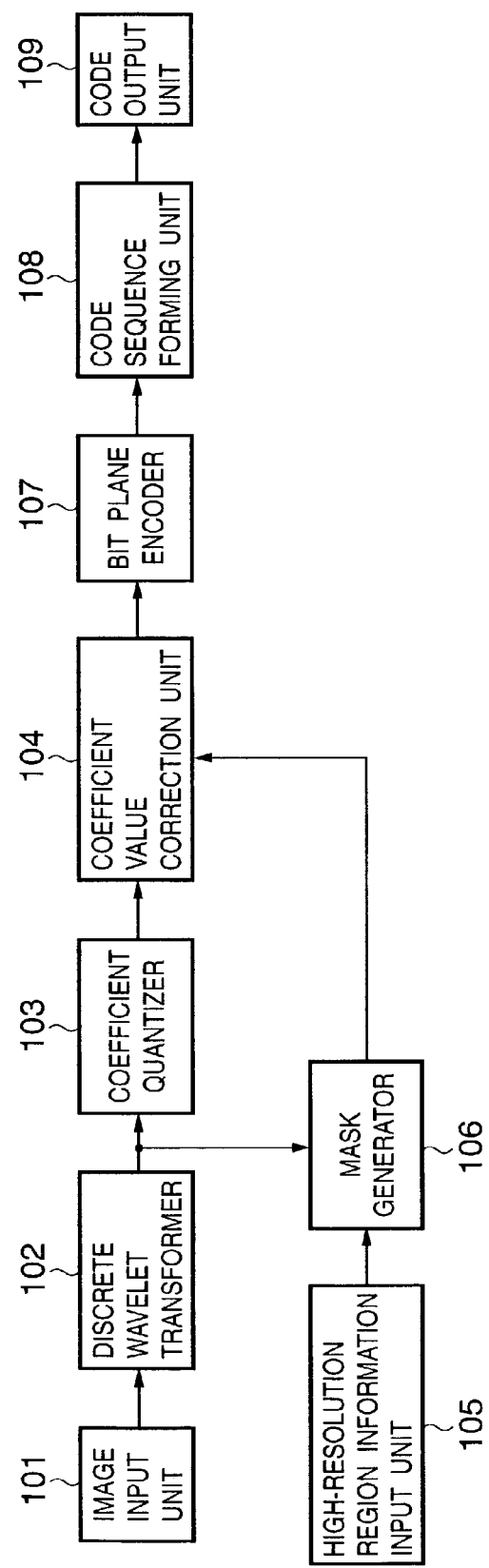
FIG. 1 is a block diagram showing the functional arrangement of an image encoding apparatus according to the first embodiment of the present invention.

FIG. 1 shows the functional arrangement of an image encoding apparatus of this embodiment. Referring to FIG. 1, reference numeral 101 denotes an image input unit; 102, a discrete wavelet transformer; 103, a coefficient quantizer; 104, a coefficient correction unit; 105, a high-resolution region information input unit; 106, a mask generator; 107, a bit plane encoder; 108, a code sequence forming unit; and 109, a code output unit.

Figure 10:
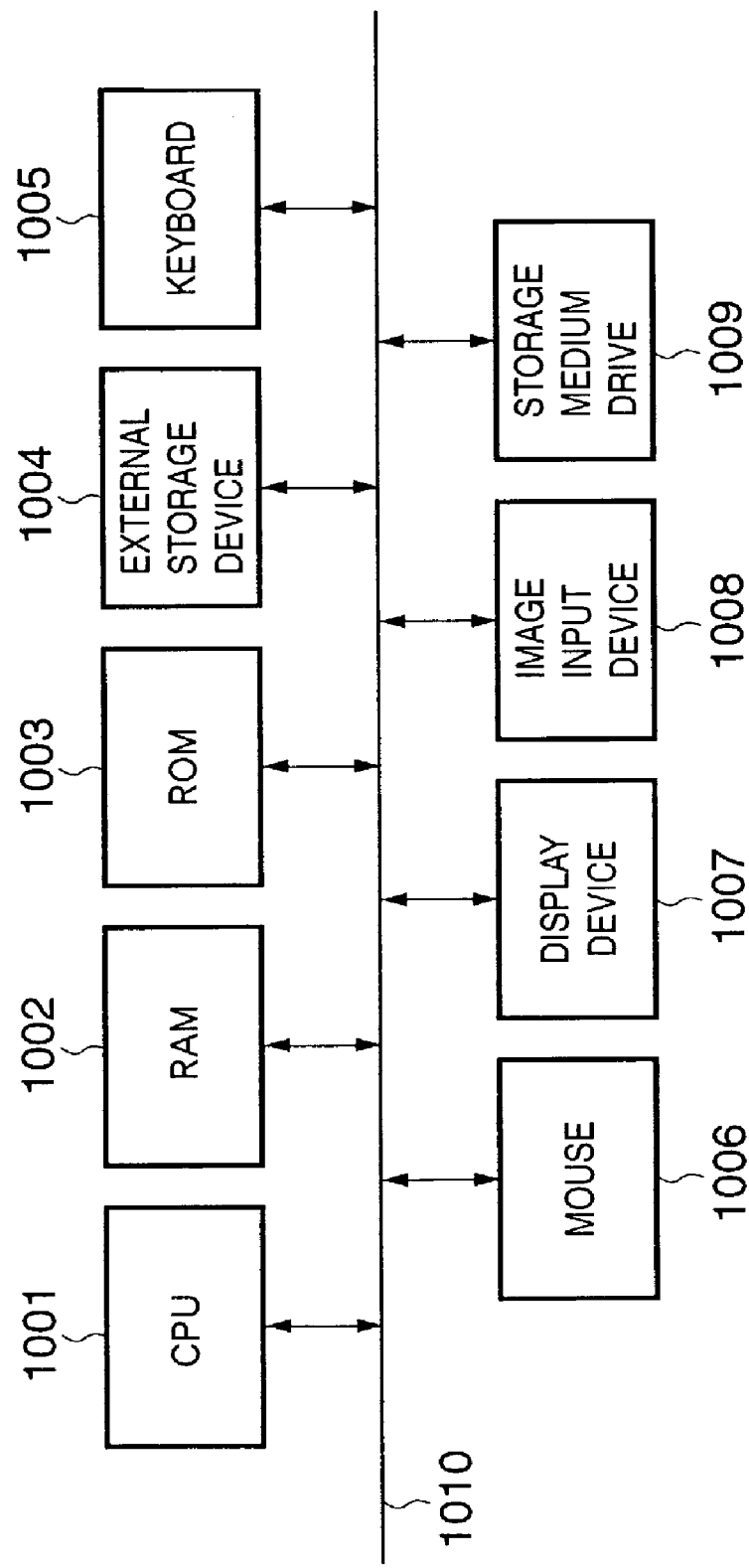
FIG. 10 is a block diagram showing the basic arrangement of an image encoding apparatus in the first to sixth embodiments of the present invention.

FIG. 10 shows the basic arrangement of the image encoding apparatus of this embodiment.

Reference numeral 1001 denotes a CPU which controls the entire image encoding apparatus of this embodiment using programs and data stored in a RAM 1002 and ROM 1003, and executes various encoding processes (to be described later). Reference numeral 1002 denotes a RAM which has an area for temporarily storing programs and data loaded from an external storage device 1004 and storage medium drive 1010, and also has a work area used when the CPU 1001 executes various processes. Reference numeral 1003 denotes a ROM which stores programs, data, and the like used to, e.g., control the entire image encoding apparatus of this embodiment. Reference numeral 1004 denotes an external storage device such as a hard disk or the like, which saves programs, data, and the like loaded from the storage medium drive 1009. Reference numerals 1005 and 1006 respectively denote a keyboard and mouse, which can input various instructions to the image encoding apparatus of this embodiment. Reference numeral 1007 denotes a display device such as a CRT, liquid crystal display, or the like, which can display various messages, text information, image information, and the like. Reference numeral 1008 denotes an image input device which includes an image sensing apparatus such as a scanner, digital camera, or the like, an image sensing device such as a CCD or the like, and various image adjustment circuits such as gamma correction, shading correction, and the like. Reference numeral 1009 denotes a storage medium drive which loads programs, data, and the like from a storage medium such as a CD-ROM, DVD, or the like, and outputs them to the RAM 1002, external storage device 1004, and the like. Reference numeral 1010 denotes a bus which interconnects the aforementioned units.

Note that programs of encoding processes to be described later are loaded from a storage medium such as a CD-ROM, DVD, or the like via the drive 1009, and are executed. However, the present invention is not limited to this, and the programs may be stored in the ROM 1003.

As described above, the image encoding apparatus of this embodiment comprises the basic arrangement shown in FIG. 10. A program having the functional arrangement shown in FIG. 1 may be loaded from the storage medium drive 1009, external storage device 1004, or the like, and may be executed by the CPU 1001 to implement an image encoding apparatus with the arrangement shown in FIG. 1.

In the description of this embodiment, assume that monochrome image data in which the luminance value of one pixel is expressed by 8 bits is to be encoded. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data.

The functions and operations of the respective units of the image encoding apparatus with the functional arrangement shown in FIG. 1 will be described below.

Image data P(x, y) to be encoded by the encoding process of the image encoding apparatus of this embodiment is input from the image input unit 101 in the raster scan order. The image input unit 101 serves as the image input device 1008, and has an image sensing function such as a scanner, digital camera, or the like. The image input unit 101 also includes an image sensing device such as a CCD or the like, and various image adjustment circuit functions such as gamma correction, shading correction, and the like.

The discrete wavelet transformer 102 executes two-dimensional discrete wavelet transformation of the image data P(x, y) input from the image input unit 101 while storing the image data in the RAM 1002 as needed. The transformer 102 decomposes the image data P(x, y) into seven subbands LL, LH1, HL1, HH1, LH2, HL2, and HH2, and outputs coefficients of respective seven subbands to an area different from that which stores the image data P(x, y) in the RAM 1002. In the following description, C(S, x, y) represents the coefficient of each subband. S represents a subband, i.e., one of LL, LH1, HL1, HH1, LH2, HL2, and HH2. Also, x and y indicate the horizontal and vertical coefficient positions when the coefficient position of the upper left corner in each subband is (0, 0). The two-dimensional discrete wavelet transformation is implemented by applying one-dimensional transformation (filter process) in the horizontal and vertical directions of the image to be transformed.

Figure 4A:
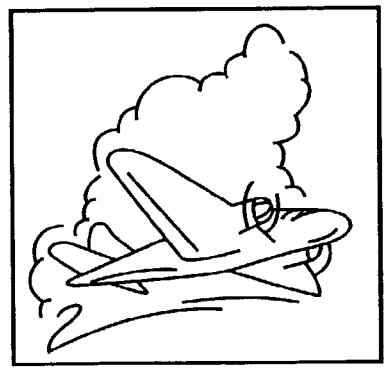
FIGS. 4A to 4C are views showing a two-dimensional discrete wavelet transformation process for an image to be encoded.
Figure 4B:
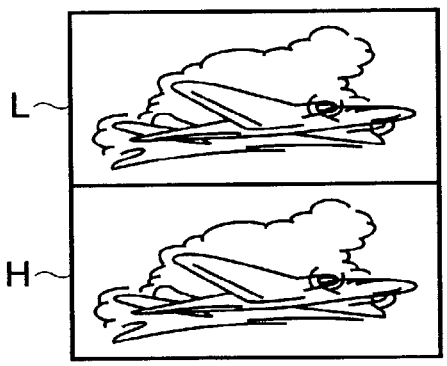
Figure 4C:
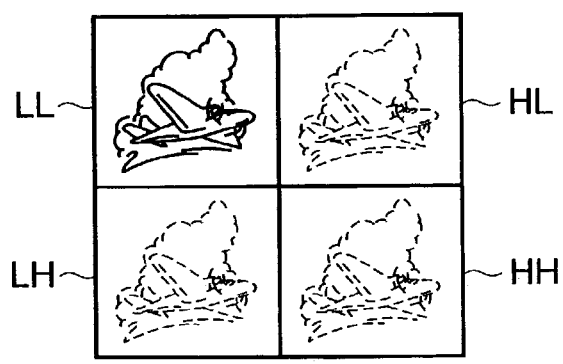
Figure 5:
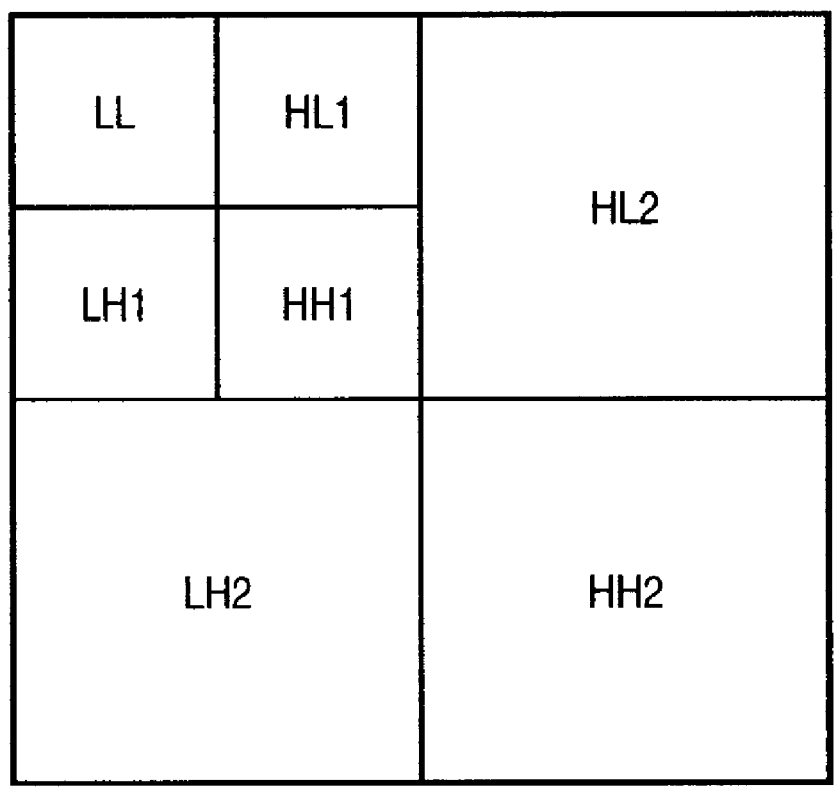
FIG. 5 shows an example of subbands obtained when one-dimensional wavelet transformation is repeated twice.

FIGS. 4A to 4C show the two-dimensional discrete wavelet transformation processes for the image to be encoded. one-dimensional discrete wavelet transformation is applied to the image to be encoded (FIG. 4A) in the vertical direction to decompose it into low-frequency subband L and high-frequency subband H (FIG. 4B). Furthermore, one-dimensional discrete wavelet transformation is applied to each of these subbands in the horizontal direction to decompose them into four subbands LL, HL, LH, and HH (FIG. 4C). In the image encoding apparatus of this embodiment, one-dimensional discrete wavelet transformation for N one-dimensional signals x(n) (n=0 to N−1) is described by:

$$h(n)=x(2n+1)-(x(2n)+x(2n+2))/2 \quad (1)$$

$$l(n)=x(2n)+(h(n-1)+h(n)+2)/4 \quad (2)$$

where h(n) is a coefficient of the high-frequency subband, and l(n) is that of the low-frequency subband. Note that x(n) (n<0 and n≧N) at two ends of the one-dimensional signals x(n) required to calculate the above equations are calculated in advance from the values of the one-dimensional signals x(n) (0≦n<N) by a known method (a detailed description thereof will be omitted). By repetitively applying two-dimensional discrete wavelet transformation to subband LL obtained by the aforementioned two-dimensional discrete wavelet transformation, it can be decomposed into seven subbands LL, LH1, HL1, HH1, LH2, HL2, and HH2, as shown in FIG. 5. Note that LL in FIG. 5 is not equal to that in FIG. 4C, since it is obtained by re-decomposing LL in FIG. 4C.

The coefficient quantizer 103 quantizes coefficients C(S, x, y) of respective subbands generated by the discrete wavelet transformer 102 using quantization steps delta(S) which are determined for respective subbands. If Q(S, x, y) represents the quantized coefficient value, the quantization process executed by the coefficient quantizer 103 is described by:

$$Q(S,x,y)=\text{sign}\{C(S,x,y)\}\times\text{floor}\{|C(S,x,y)|/\text{delta}(S)\}$$

where sign{I} is a function which indicates the positive/negative sign of integer I, and returns 1 if I is positive or −1 if I is negative. Also, floor{R} represents a maximum integral value that does not exceed real number R.

On the other hand, the high-resolution region information input unit 105 inputs region designation information H(x, y) that designates a region (e.g., a text region in an image) that requires a high resolution in synchronism with the image data input from the image input unit 101. This input may be made by the operator of the image encoding apparatus of this embodiment or as a result of the image process by the image encoding apparatus of this embodiment.

In the former case, an image to be encoded is displayed on the display device 1007, and the operator selects a region that requires a high resolution using the keyboard 1005 and mouse 1006 with reference to the image displayed on the display device 1007. Upon this selection, a GUI or the like may be used.

In the latter case, if a region that requires a high resolution is a text region in an image, this text region may be estimated using an image process such as an edge process. Also, in the latter case, an image must be input from the image input unit 101.

Note that H(x, y) assumes a value "0" or "1". If H(x, y)=1, it indicates a region that requires a high resolution; if H(x, y)=0, it indicates a region that does not require a high resolution. Also, H(0, 0) indicates region designation information for a pixel at the upper left corner of an image.

On the basis of region designation information H(x, y) input (designated) from the high-resolution region information input unit 105, the mask generator 106 generates mask information M(S, x, y) (S is one of HL2, LH2, and HH2) indicating whether or not respective coefficients of HL2, LH2, and HH2 subbands are generated with reference to pixels of a high-resolution region. When at least one pixel in a high-resolution region, i.e., P(x, y) corresponding to H(x, y)=1, is used during a process of calculating C(S, x, y) from image data P(x, y) using equations (1) and (2), mask information M(S, x, y) is 1; otherwise, it is set to be 0. Note that mask information M(S, 0, 0) indicates that corresponding to a coefficient at the upper left corner of those contained in each subband S.

The coefficient value correction unit 104 corrects a coefficient Q(S, x, y) of each subband quantized by the coefficient quantizer 103 with reference to M(S, x, y) generated by the mask generator 106 to obtain a corrected quantized value Q' (S, x, y) if subband S is one of HL2, LH2, and HH2. If subband S is other than HL2, LH2, and HH2, a corrected quantized value Q'(S, x, y)=Q(S, x, y) If subband S is one of HL2, LH2, and HH2, Q'(S, x, y) is given by:

$$Q'(S, x, y) = \begin{cases} Q(S, x, y) & \text{(if } M(S, x, y) = 1) \\ 0 & \text{(if } M(S, x, y) = 0) \end{cases}$$

That is, if a coefficient is associated with a pixel within a high-resolution region, Q(S, x, y) is directly output as the corrected quantized value; if a coefficient is not associated with pixel within a high-resolution region, Q(S, x, y) is replaced by zero.

The bit plane encoder 107 encodes the corrected quantized values Q'(S, x, y) generated by the coefficient value correction unit 104 to generate a code sequence. A method of segmenting coefficients of respective subbands into blocks and individually encoding them to allow easy random access is known. However, in this embodiment, coefficients are encoded for respective subbands for the sake of simplicity. The corrected quantized values Q'(S, x, y) (to be simply referred to as coefficient values hereinafter) of respective subbands are encoded by expressing the absolute values of the coefficient values Q'(S, x, y) in each subband by natural binary values, and executing binary arithmetic coding from the upper to lower digits while giving priority to the bit plane direction. In the following description, Qn(S, x, y) represents a bit at the n-th digit position from the LSB when the corrected quantized value Q'(S, x, y) of each subband is expressed by a natural binary number. Note that variable n indicating the digit of a binary value is called a bit plane number, and bit plane number n has the LSB at the 0th digit position.

Figure 6:
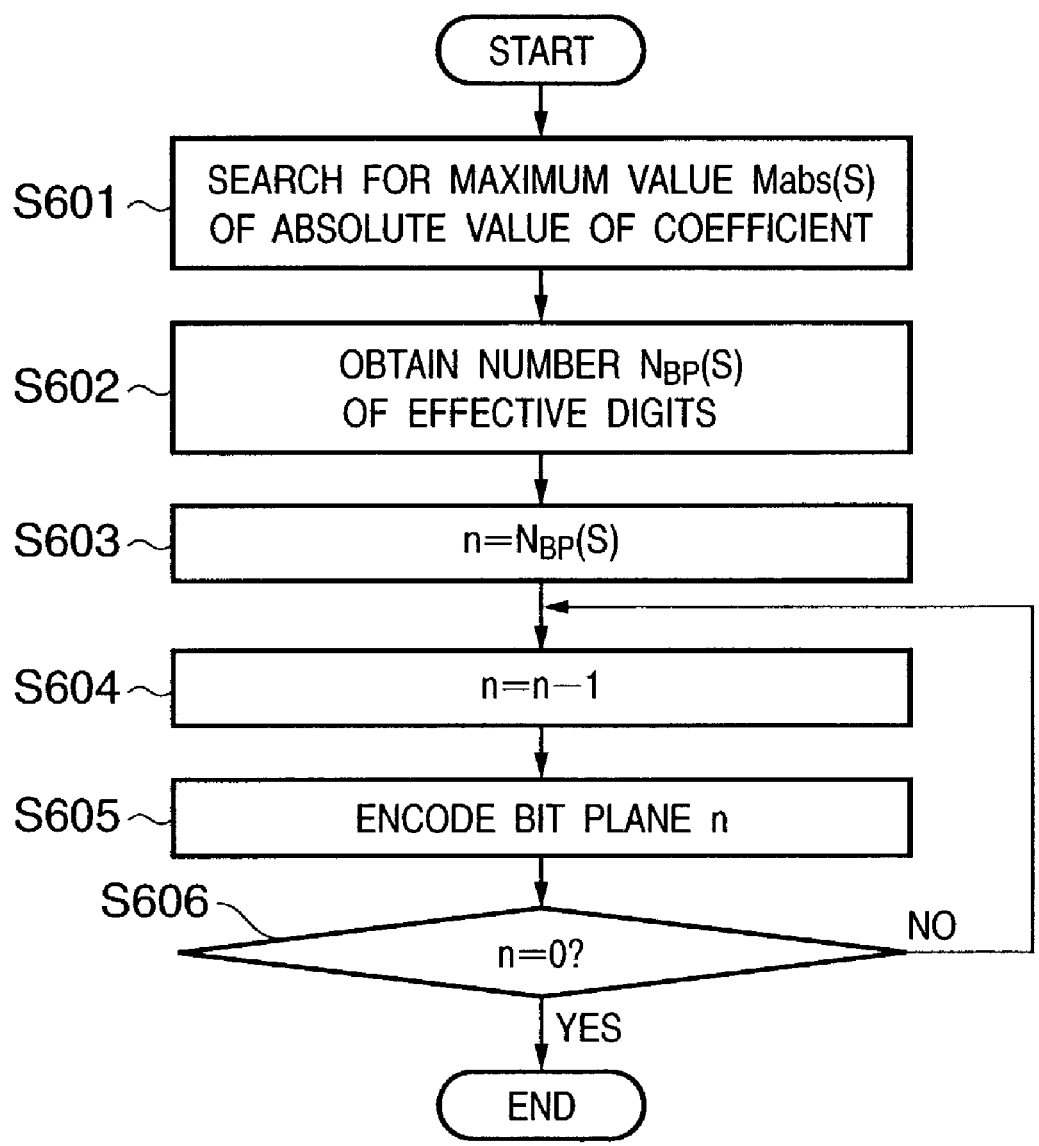
FIG. 6 is a flow chart showing a process for encoding subband S.

FIG. 6 is a flow chart showing the process for encoding subband S by the bit plane encoder 107.

Step S601 obtains a maximum value Mabs(S) of the absolute values of the coefficients in subband S, step S602 obtains the number $N_{BP}(S)$ of effective digits required to express the maximum value Mabs(S), step S603 substitutes the number of effective digits in variable n, step S604 calculates (n−1) and substitutes it in n, step S605 encodes a bit plane of the n-th digit, and step S606 checks if n=0.

The flow of the encoding process of subband S by the bit plane encoder 107 will be explained below with reference to FIG. 6. In step S601, the absolute values of the coefficients in subband S to be encoded are checked to obtain a maximum value Mabs(S). In step S602, the number $N_{BP}(S)$ of effective digits required to express Mabs(S) by a binary number is calculated by:

$N_{BP}(S)=\text{ceil}\{ \log 2(\text{Mabs}(S)+1)\}$ where ceil{R} indicates a minimum integer equal to or larger than real number R. In step S603, the number $N_{BP}(S)$ of effective digits is substituted in bit plane number n. In step S604, 1 is subtracted from bit plane number n. In step S605, bit plane n is encoded using a binary arithmetic code. In this embodiment, QM-Coder is used as the arithmetic code.

Since a sequence for encoding a binary symbol generated in a given context using this QM-Coder, or the initialization and termination sequences for the arithmetic encoding process have been explained in detail in ITU-T Recommendation T.81|ISO/IEC10918-1 as the international standards of still images, a detailed description thereof will be omitted. For the sake of simplicity, in this embodiment, respective bits undergo arithmetic encoding by a single context. An arithmetic encoder (not shown) in the bit plane encoder 107 is initialized at the beginning of encoding of each bit plane, and undergoes a termination process at the end of the process. Immediately after '1' to be encoded first of each coefficient, the sign of that coefficient is expressed by 0 or 1, and is encoded by the arithmetic encoder. If the sign is positive, a symbol '0' is encoded; if it is negative, a symbol '1' is encoded. For example, if a coefficient is −5 and the number $N_{BP}(S)$ of effective digits of subband S to which this coefficient belongs is 6, the absolute value of that coefficient is expressed by a binary value 000101, and is encoded from the upper to lower digits upon encoding respective bit planes. Upon encoding the second bit plane (in this case, the fourth digit from the MSB side), first '1' is encoded, and immediately after this encoding, the sign is converted into an arithmetic code '1'.

In step S606, bit plane number n is compared with 0. If n=0, i.e., if the LSB plane has been encoded in step S605, the encoding process of the subband ends; otherwise, the flow returns to step S604.

With the above process, all coefficients of subband S are encoded to generate code sequences CS(S, n) corresponding to respective bit planes n. The generated code sequences are sent to the code sequence forming unit 108. The sent coefficient sequences are temporarily stored in the RAM 1002.

If the bit plane encoder 107 has encoded the coefficients of all subbands and all code sequences are stored in the RAM 1002, the code sequence forming unit 108 reads out the code sequences stored in the RAM 1002 in a predetermined order, inserts additional information required upon decoding to form a final code sequence as the output of the image encoding apparatus of this embodiment, and outputs that code sequence to the code output unit 109.

The final code sequence generated by the code sequence forming unit 108 consists of a header and encoded data hierarchized in three levels 0, 1, and 2. The encoded data of level 0 consists of code sequences CS(LL, $N_{BP}$(LL)−1) to CS(LL, 0) obtained by encoding the coefficients of LL subband. The encoded data of level 1 consists of code sequences CS(LH1, $N_{BP}$(LH1)−1) to CS(LH1, 0), CS(HL1, $N_{BP}$(HL1)−1) to CS(HL1, 0), and CS(HH1, $N_{BP}$(HH1)−1) to CS(HH1, 0) obtained by encoding the coefficients of LH1, HL1, and HH1 subbands. The encoded data of level 2 consists of code sequences CS(LH2, $N_{BP}$(LH2)−1) to CS(LH2, 0), CS(HL2, NBP(HL2)−1) to CS(HL2, 0), and CS(HH2, $N_{BP}$(HH2)−1) to CS(HH2, 0) obtained by encoding the coefficients of LH2, HL2, and HH2 subbands.

Figure 3:
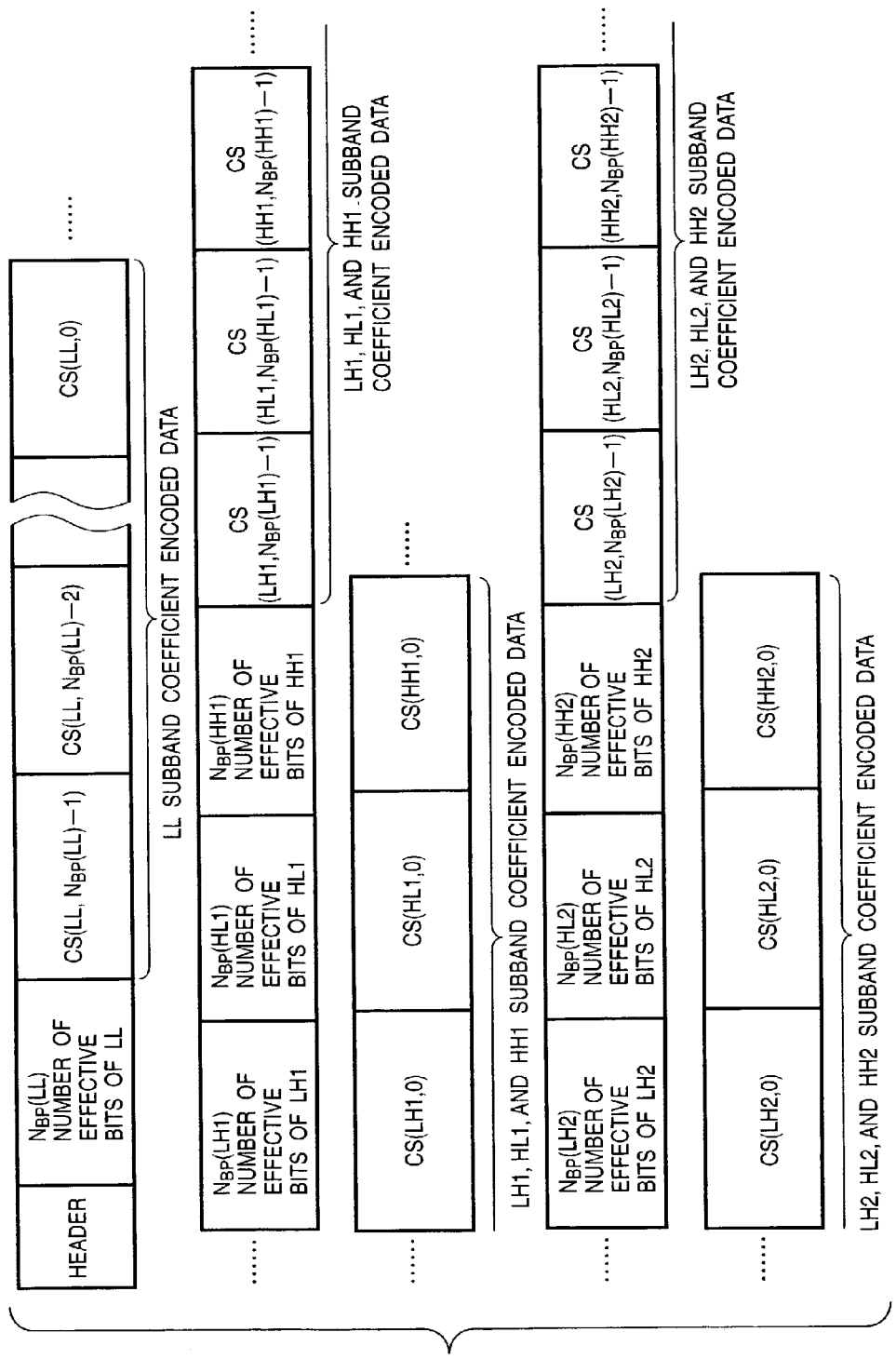
FIG. 3 shows the structure of a code sequence.

FIG. 3 shows the structure of the code sequence generated by the code sequence forming unit 108.

The code output unit 109 outputs the code sequence generated by the code sequence forming unit 108 outside the apparatus. The code output unit 109 includes, e.g., a function of a storage device such as the storage medium drive 1010, external storage device 1004, or the like, and a function of a network interface or the like.

As described above, transform coefficients required to obtain a high resolution are held for a region for which a high resolution is required, and other transform coefficients are replaced by zero upon encoding. Hence, image data that includes regions having different required resolutions can efficiently undergo lossy encoding.

In this embodiment, the coefficient value correction unit 104 corrects quantized values Q(S, x, y) from the coefficient quantizer 103. However, the present invention is not limited to such specific arrangement. For example, coefficients from the discrete wavelet transformer 102 may be directly corrected.

SECOND EMBODIMENT

Figure 2:
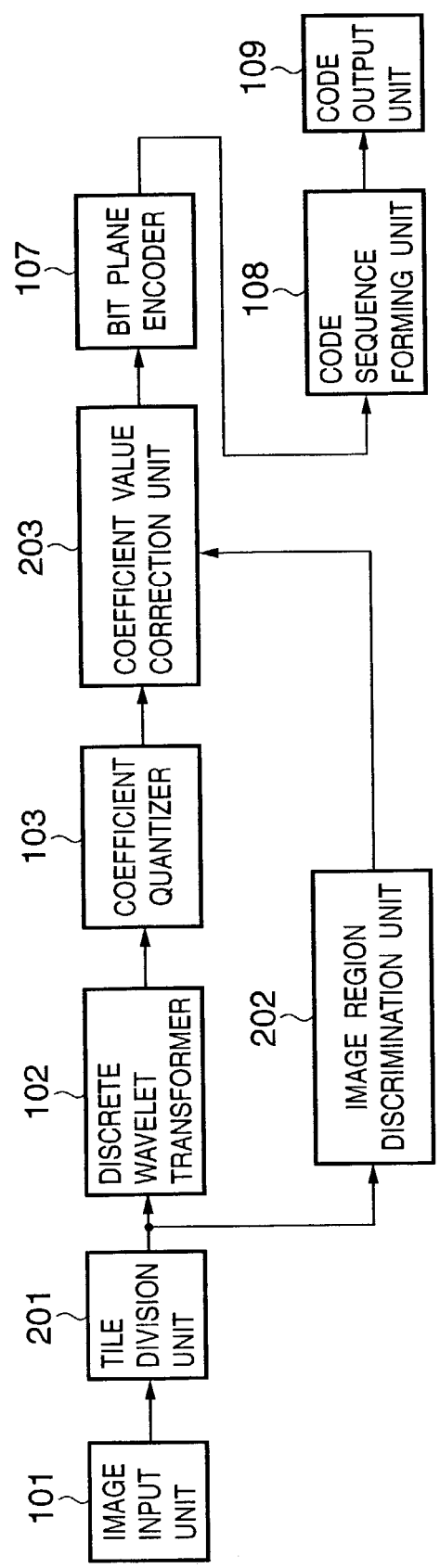
FIG. 2 is a block diagram showing the functional arrangement of an image encoding apparatus according to the second embodiment of the present invention.

FIG. 2 shows the functional arrangement of an image encoding apparatus according to this embodiment. The same reference numerals in FIG. 2 denote the same parts as those in FIG. 1, and a description thereof will be omitted. Also, the basic arrangement of the image encoding apparatus of this embodiment is the same as that (FIG. 10) in the first embodiment. Furthermore, a text region in an image is used as a region that requires a high resolution in this embodiment, but the present invention is not limited to such specific region.

Referring to FIG. 2, reference numeral 201 denotes a tile division unit; 202, an image region discrimination unit; and 203, a coefficient value correction unit.

In the description of this embodiment, assume that monochrome image data in which the luminance value of one pixel is expressed by 8 bits is to be encoded, as in the first embodiment. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data.

The functions and operations of the respective units of the image encoding apparatus with the functional arrangement shown in FIG. 2 will be described below.

Image data P(x, y) is input from the image input unit 101 in the raster scan order. The image input unit 101 serves as the image input device 1008, and has an image sensing function such as a scanner, digital camera, or the like. The image input unit 101 also includes an image sensing device such as a CCD or the like, and various image adjustment circuit functions such as gamma correction, shading correction, and the like.

Figure 7:
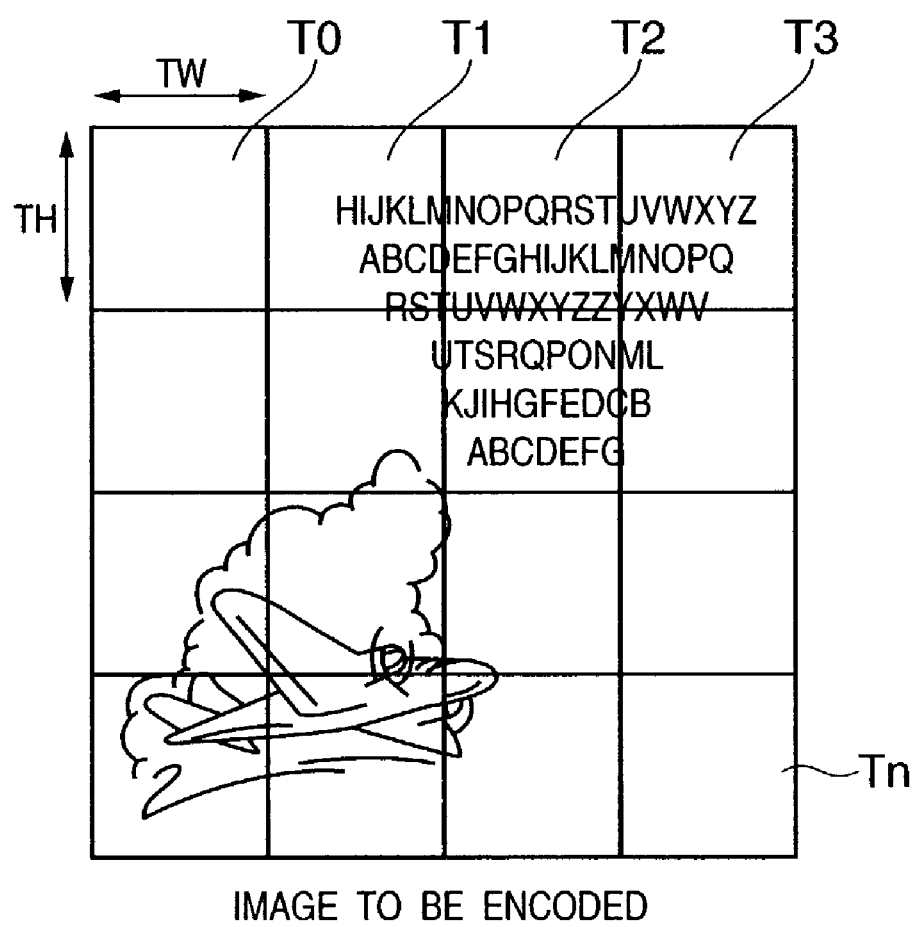
FIG. 7 is a view for explaining an example of tiles divided by a tile division unit 201.

The tile division unit 201 stores the image data P(x, y) input from the image input unit 101 in the raster scan order in the RAM 1002, and divides it into tiles each having a predetermined width TW and height TH. FIG. 7 shows an example of tiles divided by the tile division unit 201. As shown in FIG. 7, T0 represents a tile at the upper left corner position, numbers T1, T2, ..., Tn are assigned to tiles in the raster scan order, and Ti(x, y) (i=0 to n) represents the pixel value in each tile. Note that Ti(0, 0) indicates the value of a pixel at the upper left corner position of the i-th tile.

After that, tiles T0 to Tn formed by the tile division unit 201 are encoded in turn.

The discrete wavelet transformer 102 executes two-dimensional discrete wavelet transformation of the tile data Ti(x, y) formed by the tile division unit 201 while appropriately storing them in the RAM 1002. The transformer 102 decomposes each tile data Ti(x, y) into seven subbands LL, LH1, HL1, HH1, LH2, HL2, and HH2, and outputs coefficients of respective seven subbands to an area different from that which stores the tile data Ti(x, y) in the RAM 1002. The subband decomposition method of tile data Ti(x, y) by the discrete wavelet transformer 102 is the same as that of pixel data P(x, y) in the first embodiment.

The coefficient quantizer 103 quantizes coefficients C(S, x, y) of respective subbands generated by the discrete wavelet transformer 102 as in the first embodiment.

The image region discrimination unit 202 acquires tile data Ti(x, y) divided by the tile division unit 201 at the same timing as the discrete wavelet transformer 102, checks if each tile contains text information, and outputs checking result (image region separation information) Z. If it is determined that the tile contains text information, image region separation information Z is 1; otherwise, Z is 0. In this method, a practical image region determination method is not particularly limited. For example, each tile data may be displayed on the display device 1007, and the operator of the image encoding apparatus of this embodiment may check the presence/absence of text information using the keyboard 1005 or mouse 1006 and may input the checking result. In such case, the image region discrimination unit 202 executes a process for reflecting the input result in the image region separation information Z. In addition, each tile data Ti may undergo a differential process, it may be checked based on edge information as a result of the differential process if the tile data Ti contains text information, and the checking result may be output as image region separation information Z. In this case, the image region discrimination unit 202 executes an edge information derivation process such as the differential process, and the aforementioned determination process using the edge information, and then executes a process for reflecting that result in image region separation information Z.

The coefficient value correction unit 203 corrects a coefficient Q(S, x, y) of each subband quantized by the coefficient quantizer 103 with reference to the image region separation information Z generated by the image region discrimination unit 202 to obtain a corrected quantized value Q'(S, x, y) if subband S is one of HL2, LH2, and HH2. If subband S is other than HL2, LH2, and HH2, a corrected quantized value Q'(S, x, y)=Q(S, x, y). If subband S is one of HL2, LH2, and HH2, Q'(S, x, y) is given by:

$$Q'(S, x, y) = \begin{cases} Q(S, x, y) & \text{(if } Z = 1) \\ 0 & \text{(if } Z = 0) \end{cases}$$

That is, if it is determined that each tile contains text information, Q(S, x, y) is directly output as the corrected quantized value; otherwise, all coefficients of HL2, LH2, and HH2 subbands of that tile are replaced by zero.

The bit plane encoder 107 encodes the corrected quantized values Q'(S, x, y) generated by the coefficient value correction unit 104 to generate a code sequence. The encoding method of the corrected quantized values Q'(S, x, y) of respective subbands is as has been described in the first embodiment. If the checking result Z output from the image region discrimination unit 202 is zero, since the coefficient value correction unit 203 replaces all corrected quantized values of HL2, LH2, and HH2 subbands by zero, all the numbers $N_{BP}(HL2)$, $N_{BP}(LH2)$, and $N_{BP}(HH2)$ of effective bits of respective subbands become zero, and no subband coefficient encoded data is generated.

If the bit plane encoder 107 has encoded the coefficients of all subbands of one tile and all code sequences are stored in the RAM 1002, the code sequence forming unit 108 reads out the code sequences stored in the RAM 1002 in a predetermined order, inserts additional information required upon decoding that tile to form encoded data of the tile, and outputs that code sequence to the code output unit 109. If the tile is the first one (tile number T0) of image data, the code sequence forming unit 108 further inserts additional information required to decode image data such as the numbers of samples in the horizontal and vertical directions of an image, the sizes TW and TH of each tile, and the like, at the head of the code sequence.

Figure 8:
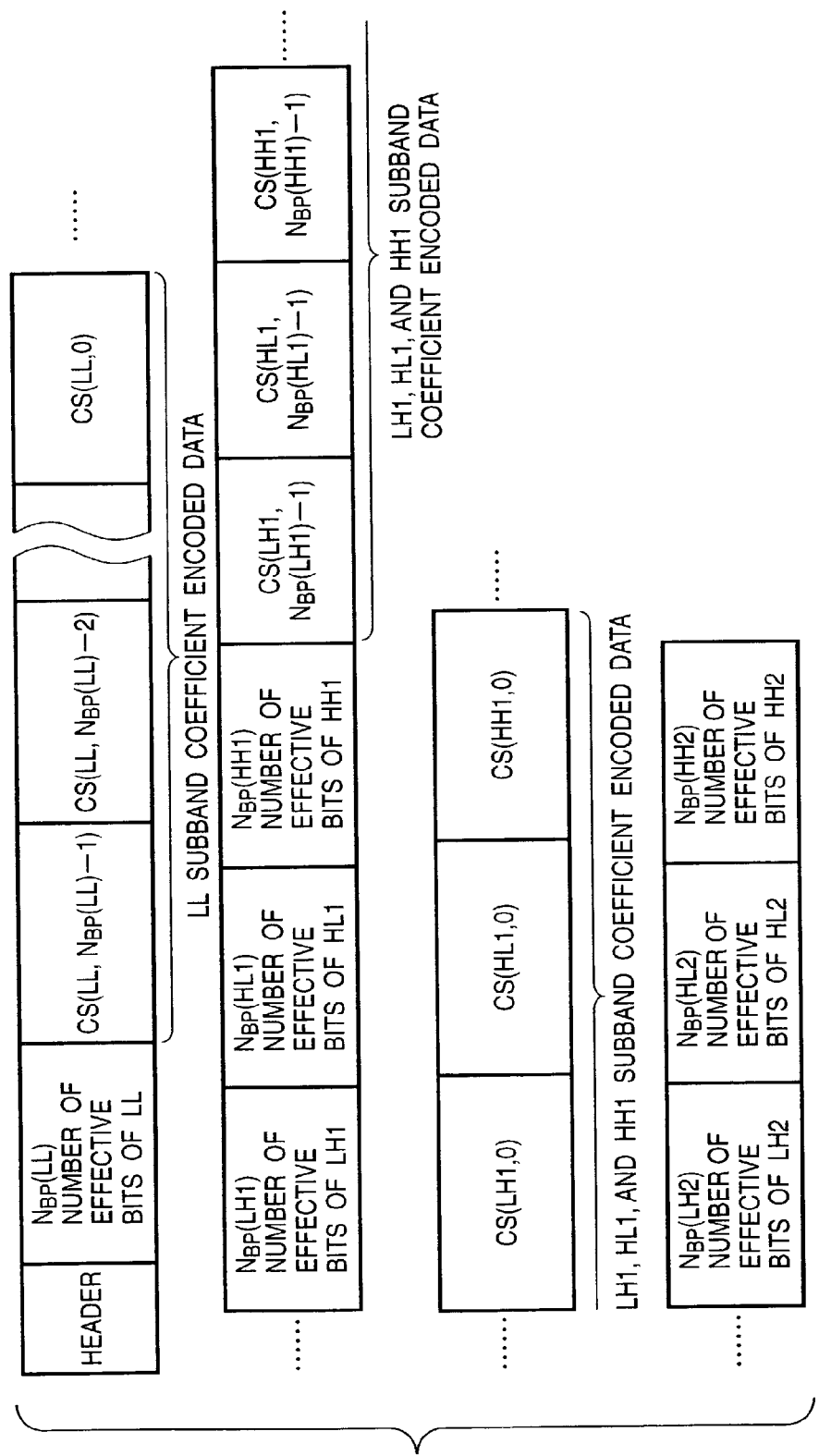
FIG. 8 shows the structure of tile encoded data when image region separation information Z output from an image region discrimination unit 202 is zero in the second embodiment of the present invention.

The encoded data of each tile generated by the code sequence forming unit 108 consists of a header and encoded data hierarchized in three levels 0, 1, and 2. The encoded data of level 0 consists of code sequences CS(LL, $N_{BP}$(LL)−1) to CS(LL, 0) obtained by encoding the coefficients of LL subband. The encoded data of level 1 consists of code sequences CS(LH1, $N_{BP}$(LH1)−1) to CS(LH1, 0), CS(HL1, NBP(HL1)−1) to CS(HL1, 0), and CS(HH1, NBP (HH1)−1) to CS(HH1, 0) obtained by encoding the coefficients of LH1, HL1, and HH1 subbands. The encoded data of level 2 consists of code sequences CS(LH2, $N_{BP}$ (LH2)−1) to CS(LH2, 0), CS(HL2, $N_{BP}$(HL2)−1) to CS(HL2, 0), and CS(HH2, $N_{BP}$ (HH2)−1) to CS(HH2, 0) obtained by encoding the coefficients of LH2, HL2, and HH2 subbands. However, if the image region separation information Z output from the image region discrimination unit 202 is 0, encoded data of level 2 includes only information indicating the numbers of effective bits of respective subbands. FIG. 8 shows the structure of tile encoded data in this case.

The structure of tile encoded data when the checking result Z output from the image region discrimination unit 202 is 1 is the same as that of the code sequence of the first embodiment shown in FIG. 3.

The code output unit 109 outputs the tile encoded data generated by the code sequence forming unit 108 outside the apparatus. The code output unit 109 includes, e.g., a function of a storage device such as the storage medium drive 1010, external storage device 1004, or the like, and a function of a network interface or the like.

With the above process, it is checked for each tile if high-resolution data is necessary. For a tile that does not require high-resolution data, transform coefficients required to obtain a high resolution are replaced by zero upon encoding. Hence, image data that includes regions having different required resolutions can efficiently undergo lossy encoding.

THIRD EMBODIMENT

Figure 9:
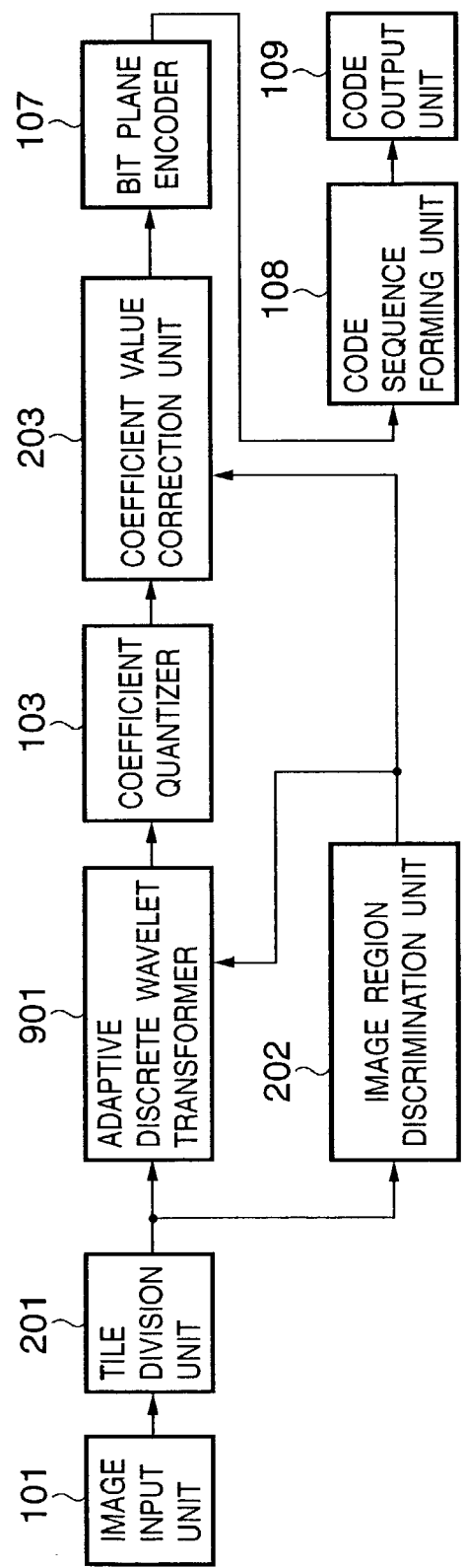
FIG. 9 is a block diagram showing the functional arrangement of an image encoding apparatus according to the third embodiment of the present invention.

FIG. 9 shows the functional arrangement of an image encoding apparatus according to this embodiment. The same reference numerals in FIG. 9 denote the same parts as those in FIGS. 1 and 2, and a description thereof will be omitted. Also, the basic arrangement of the image encoding apparatus of this embodiment is the same as that (FIG. 10) in the first embodiment.

Referring to FIG. 9, reference numeral 901 denotes an adaptive discrete wavelet transformer. The adaptive discrete wavelet transformer 901 has a function of selecting a filter to be used in subband decomposition in accordance with image region separation information Z.

In the description of this embodiment, assume that monochrome image data in which the luminance value of one pixel is expressed by 8 bits is to be encoded, as in the first and second embodiments. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data.

Since the image encoding apparatus of this embodiment is substantially the same as the second embodiment except that the discrete wavelet transformer 102 is replaced by the adaptive discrete wavelet transformer 901, and the connection is changed to input the image region separation information Z of the image region discrimination unit 202 to the adaptive discrete wavelet transformer 901, only the operation of the changed adaptive discrete wavelet transformer 901 will be explained.

The adaptive discrete wavelet transformer 901 executes two-dimensional discrete wavelet transformation of the tile data Ti(x, y) formed by the tile division unit 201 while storing them in the RAM 1002 as needed. The transformer 102 decomposes each tile data Ti(x, y) into seven subbands LL, LH1, HL1, HH1, LH2, HL2, and HH2, and outputs coefficients of respective seven subbands to an area different from that which stores the tile data Ti(x, y) in the RAM 1002. The subband decomposition method of tile data Ti(x, y) by the discrete wavelet transformer 901 is substantially the same as that of pixel data P(x, y) in the first embodiment, except that a filter to be used is switched in accordance with the image region separation information Z from the image region discrimination unit 202. If the image region separation information Z from the image region discrimination unit 202 is zero, i.e., if it is determined that a given tile does not contain any text region, a filter given by equations (1) and (2) is used as in discrete wavelet transformation of the first and second embodiments. On the other hand, if the checking result Z is 1, i.e., if it is determined that a given tile contains a text region, the following equations are used in place of equations (1) and (2):

$$h(n)=x(2n)-x(2n+1) \quad (3)$$

$$l(n)=\text{floor}\{x(2n)+x(2n+1)/2\} \quad (4)$$

where floor{R} represents a maximum integral value that does not exceed real number R. Hence, since this embodiment uses two filters, these filters must be stored in the external storage device 1004 or RAM 1002.

Coefficients C(S, x, y) of respective subbands generated by the adaptive discrete wavelet transformer 901 are encoded in the sequence that has been explained in the second embodiment, and encoded data is output from the code output unit 109. In this embodiment, a header inserted in each tile encoded data by the code sequence forming unit 108 contains the image region separation information Z from the image region discrimination unit 202 to inform the decoding side of the filter used.

With the above process, it is checked for each tile if a text region is contained. The filter to be used in discrete wavelet transformation is selected in accordance with the checking result, and for a tile that does not contain any text region, transform coefficients required to obtain a high resolution are replaced by zero upon encoding. Hence, image data that includes regions having different required resolutions can efficiently undergo lossy encoding.

(Modification)

The present invention is not limited to the aforementioned embodiments. For example, in the first to third embodiments described above, encoding using discrete wavelet transformation given by equations (1) and (2) has been exemplified. However, discrete wavelet transformation is not limited to that used in the above embodiments, and the types of filters and adaptive method may be changed. For example, a filter having a large number of taps, e.g., a 9/7 filter may be used instead, and two-dimensional discrete wavelet transformation may be repetitively applied to subbands other than the low-frequency subband. The bit plane encoding method using QM-Coder has been exemplified as the coefficient encoding method. However, the present invention is not limited to the above embodiments. For example, arithmetic coding methods such as MQ-Coder and the like other than QM-Coder may be applied, and other binary coding methods such as MELCODE and the like may be applied. Also, a bit plane may be categorized into a plurality of sub-bit planes in accordance with the state of coefficients near the coefficient of interest, and may be encoded in a plurality of passes. Furthermore, Golomb coding may be applied to directly execute entropy-coding of multi-valued coefficients without decomposing them into binary data.

In the above embodiments, bit plane encoding for respective subbands has been explained for the sake of simplicity. However, each subband may be further segmented into small blocks, and bit plane encoding may be applied to each small block, so as to allow easy random access.

Upon forming the code sequence, the receiving side can reconstruct an image while gradually increasing the resolution. However, the present invention is not limited to this. For example, a code sequence may be formed by arranging coefficients in descending order of values so as to gradually improve the image quality.

With the above description, upon encoding image data that contains regions which require different resolution levels, the present invention can achieve efficient image encoding.

FOURTH EMBODIMENT

Figure 11:
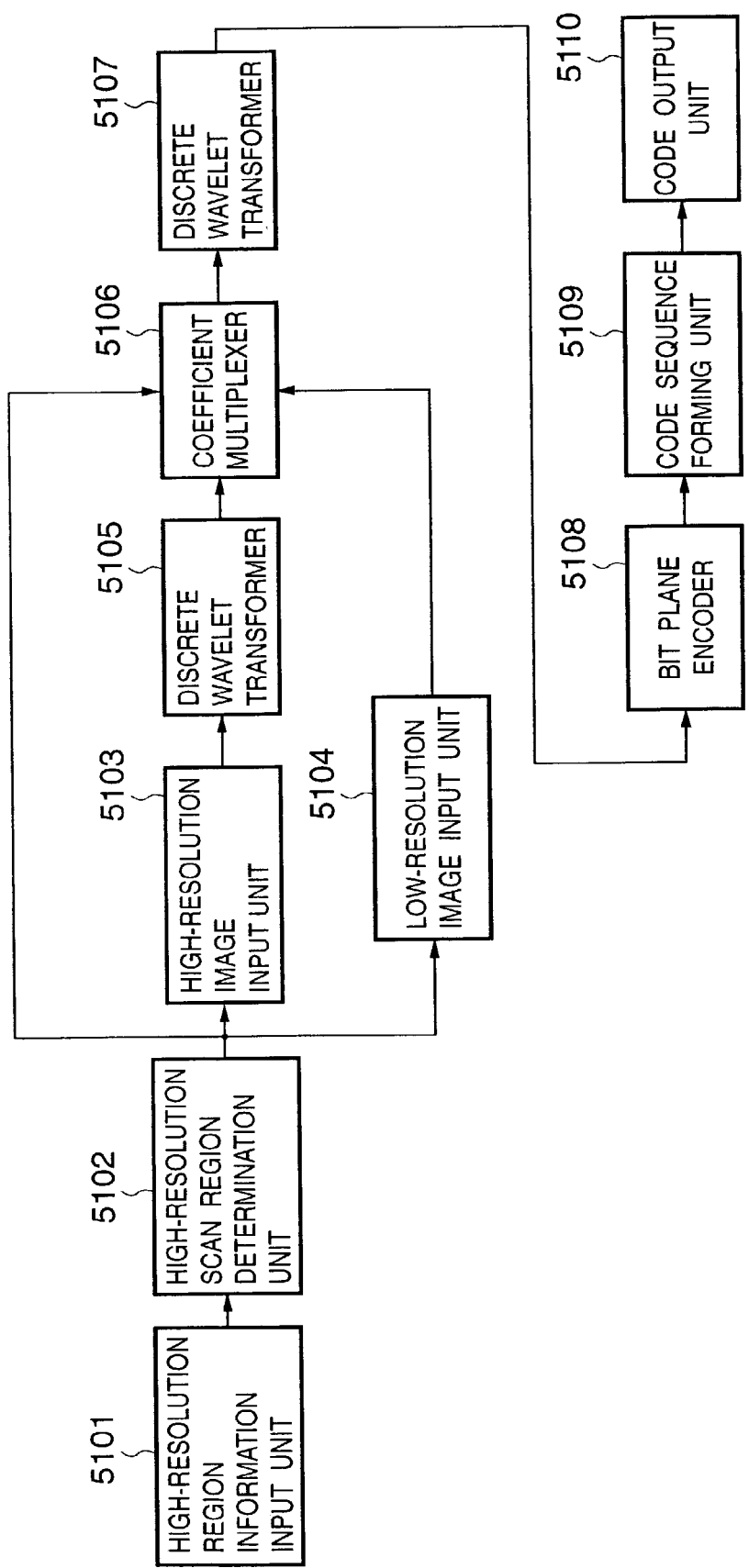
FIG. 11 is a block diagram showing the functional arrangement of an image encoding apparatus according to the fourth embodiment of the present invention.

FIG. 11 shows the functional arrangement of an image encoding apparatus according to this embodiment. Referring to FIG. 11, reference numeral 5101 denotes a high-resolution region information input unit; 5102, a high-resolution scan region determination unit; 5103, a high-resolution image input unit; 5104, a low-resolution image input unit; 5105, a discrete wavelet transformer; 5106, a coefficient multiplexer; 5107, a discrete wavelet transformer; 5108, a bit plane encoder; 5109, a code sequence forming unit; and 5110, a code output unit. Since the basic arrangement of the image encoding apparatus of this embodiment is the same as that of the first embodiment shown in FIG. 10, a description thereof will be omitted.

In the description of this embodiment, assume that a monochrome document is scanned as image data in which the luminance value of each pixel is expressed by 8 bits, and that image data is to be encoded. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data.

The functions and operations of the respective units of this embodiment will be described below with reference to FIGS. 11 and 10. In this embodiment, a monochrome document to be encoded is scanned at a predetermined resolution, and the scanned image data is encoded. In this case, only a portion of the document can be scanned at a resolution twice the predetermined resolution in both the horizontal and vertical directions. The predetermined resolution will be referred to as a low resolution, and the resolution twice the predetermined resolution in both the horizontal and vertical directions will be referred to as a high resolution hereinafter. Assume that the size of a monochrome document is fixed, and X and Y represent the image size obtained when the entire document is scanned at the high resolution. Also, both X and Y are multiples of 4.

Figure 12:
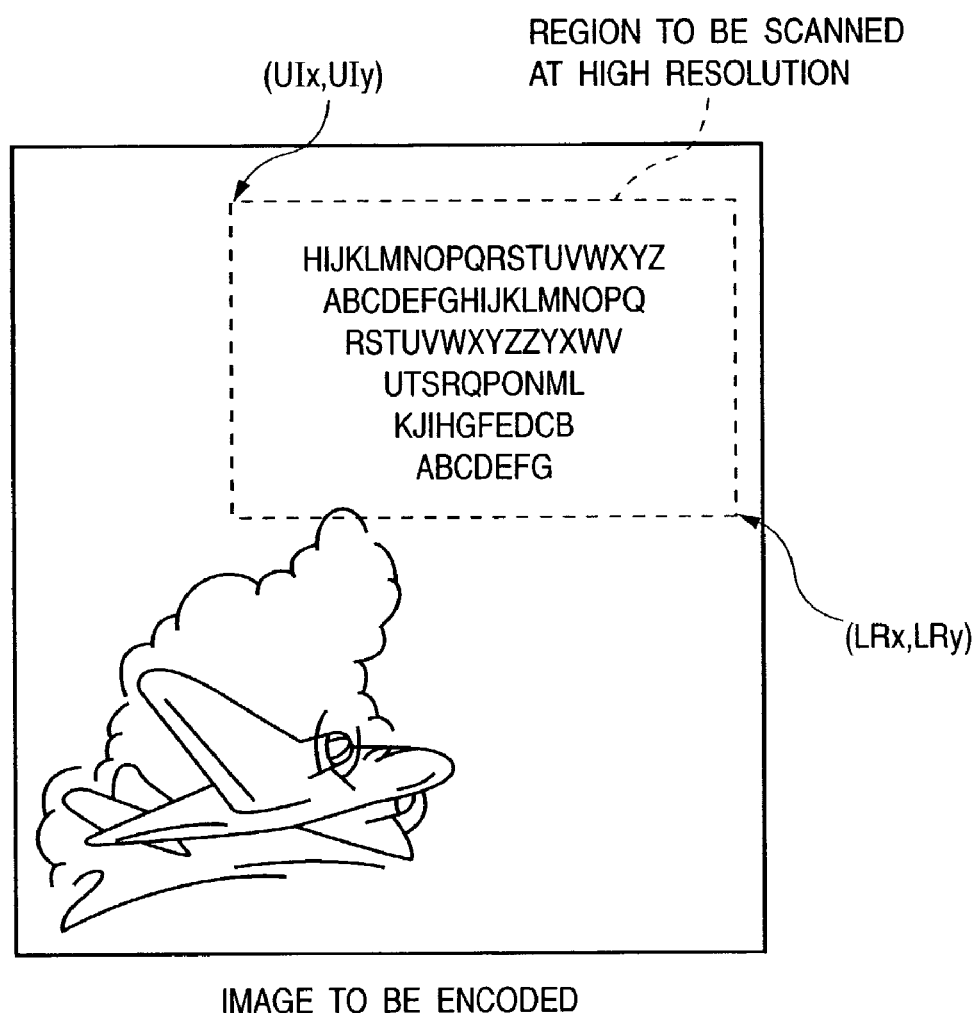
FIG. 12 shows an example of a document and high-resolution region information.

High-resolution region information that designates a portion of the document to be scanned at the high resolution is input from the high-resolution region information input unit 5101. In this embodiment, a region to be scanned at the high resolution is a rectangular region. The high-resolution region information is specified by an upper left corner pixel position (Ulx, Uly), and lower right corner pixel position (LRx, LRy) with reference to the image size when the document is scanned at the high resolution. FIG. 12 shows an example of a document and high-resolution region information.

The high-resolution scan region determination unit 5102 generates resolution flags F(x, y) that designate pixel positions to be scanned at the high resolution in practice on the basis of the upper left and lower right corner pixel positions of the high-resolution region input from the high-resolution region information input unit 5101. The generated resolution flags F(x, y) are temporarily stored in the RAM 1002. For a pixel position to be scanned at the high resolution in practice, the resolution flag F(x, y) is set to be 1; otherwise, the flag is set to be zero. More specifically, $$F(x, y) = \begin{cases} 1 & \text{floor}\{Ulx/2\} \times 2 \leq x < (\text{floor}\{LRx/2\} + 1) \times 2 \text{ and} \\ & \text{floor}\{Uly/2\} \times 2 \leq y < (\text{floor}\{LRy/2\} + 1) \times 2 \\ 0 & \text{otherwise} \end{cases}$$

Figure 13:
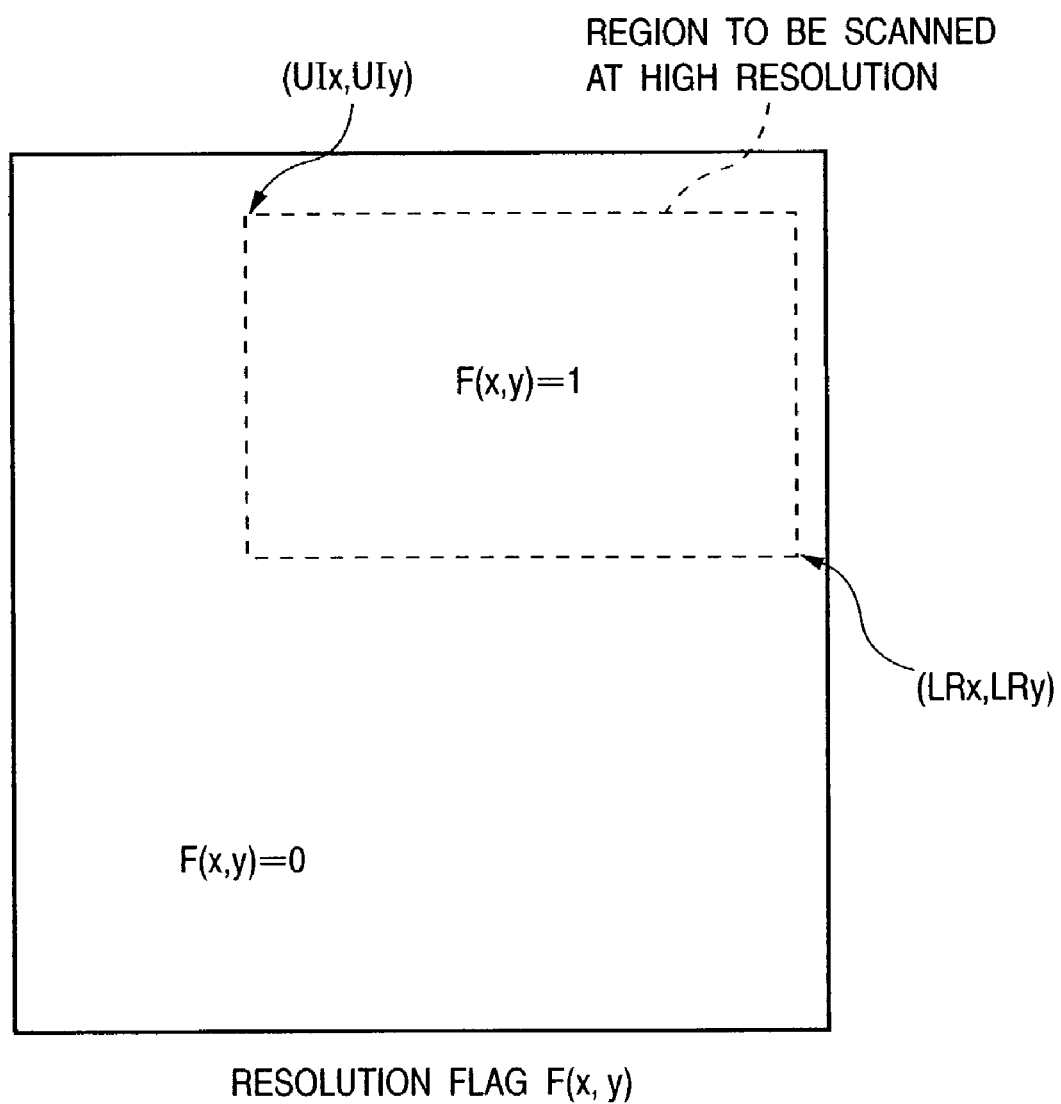
FIG. 13 shows an example of a resolution flag F(x, y) when the high-resolution region information is designated, as shown in FIG. 12.

FIG. 13 shows an example of the resolution flag F(x, y) when the high-resolution region information is designated, as shown in FIG. 12.

After the region to be scanned at the high resolution is determined by the high-resolution scan region determination unit 5102, the high- and low-resolution image input units 5103 and 5104 respectively scan images of high- and low-resolution portions on the basis of the resolution flags F(x, y). In practice, the high- and low-resolution image input units 5103 and 5104 receive an image of an identical document, and respectively scan high- and low-resolution portions.

The high-resolution image input unit 5103 scans pixel data from the monochrome document only for a portion where the resolution flags F(x, y)=1, and forms high-resolution image data Ph(x, y) in the RAM 1002. The unit 5103 does not actually scan a portion where the resolution flags F(x, y)=0 while setting Ph(x, y)=0.

The discrete wavelet transformer 5105 executes two-dimensional discrete wavelet transformation of respective pixel data Ph(x, y) of high-resolution image data input from the high-resolution image input unit 5103 while storing them in the RAM 1002 as needed, thereby decomposing the image data into four subbands LL, LH, HL, and HH. The transformer 5105 outputs coefficients of the respective subbands to an area which is different from the area where the image data Ph(x, y) is stored in the RAM 1002. In the following description, C(S, x, y) represents the coefficient of each subband. S represents a subband, i.e., one of LL, LH, HL, and HH. Also, x and y indicate the horizontal and vertical coefficient positions when the coefficient position of the upper left corner in each subband is (0, 0).

The two-dimensional discrete wavelet transformation is implemented by applying one-dimensional transformation (filter process) in the horizontal and vertical directions. Since the two-dimensional discrete wavelet transformation process is the same as that described using FIGS. 4A to 4C, a description thereof will be omitted. In the image encoding apparatus of this embodiment, one-dimensional discrete wavelet transformation for N one-dimensional signals x(n) (n=0 to N−1) is described by:

$$h(n) = x(2n) - x(2n+1) \quad (5)$$

$$l(n) = \text{floor}\{(x(2n) + x(2n+1))/2\} \quad (6)$$

where h(n) is a coefficient of the high-frequency subband, and l(n) is that of the low-frequency subband. Also, floor{R} represents a maximum integral value that does not exceed real number R.

On the other hand, the low-resolution image input unit 5104 scans image data at the low resolution for pixels with F(x, y)=0 with reference to the resolution flags generated by the high-resolution scan region determination unit 5102, and forms a low-resolution image Pl(lx, ly) in the RAM 1002 (an area different from the area where the high-resolution image data Ph (x, y) is stored). Note that lx ranges from 0 to (X/2−1), and ly ranges from 0 to (Y/2−1). Four flags F(lx×2, ly×2), F(lx×2+1, ly×2), F(lx×2, ly×2+1), and F(lx×2+1, ly×2+1) are assigned to one pixel Pl(lx, ly) of the low-resolution image. Since the coordinate values of four corners of the high-resolution region are even numbers and, hence, these four flags assume the same value, F(lx×2, ly×2) is used as an index for determining if a scan is required. That is, for lx and ly corresponding to the resolution flag F(lx×2, ly×2), an actual scan operation is skipped while setting Pl(lx, ly)=0.

Upon completion of the low-resolution image input of the low-resolution image input unit 5104, and subband decomposition of the high-resolution image in the discrete wavelet transformer 5105, the coefficient multiplexer 5106 multiplexes low-frequency subband C(LL, x, y) generated by the discrete wavelet transformer 5105 and the low-resolution image Pl(lx, ly) with reference to the resolution flags F(x, y) generated by the high-resolution scan region determination unit 5102. Since low-frequency subband C(LL, x, y) has the same size as the low-resolution image Pl(lx, ly) (the horizontal and vertical sizes are X/2 and Y/2), the multiplexing process in the coefficient multiplexer 5106 will be explained while replacing variables x and y that represent coordinate positions in the subband by lx and ly.

The coefficient multiplexer 5106 checks the resolution flags F(lx×2, ly×2) of all coefficients of C(LL, lx, ly) in the raster scan order, and replaces C(LL, lx, ly) by Pl(lx, ly) if F(lx×2, ly×2)=0. When this replacement process is done for all the coefficients of C(LL, lx, ly) in this way, coefficients corresponding to the low-resolution image portion in C(LL, lx, ly) can be replaced by the low-resolution image Pl(lx, ly).

The discrete wavelet transformer 5107 decomposes new C(LL, lx, ly) obtained by multiplexing C(LL, lx, ly) and Pl(lx, ly) by the coefficient multiplexer 5106 into four subbands by the same process as in the discrete wavelet transformer 5105. FIG. 5 shows the state wherein the multiplexed LL subband is further decomposed into four subbands by the discrete wavelet transformer 5107. In FIG. 5, LH, LH, and HH subbands generated by the discrete wavelet transformer 5105 are indicated by LH2, HL2, and HH2, and those generated by the discrete wavelet transformer 5107 are indicated by LH1, HL1, and HH1 to distinguish them from the former subbands. Note that LL in FIG. 5 is not equal to that in FIG. 4C, since it is obtained by re-decomposing LL subband in FIG. 4C multiplexed with the low-resolution image.

The bit plane encoder 5108 encodes coefficient values C(S, x, y) of seven subbands LL, LH1, HL1, HH1, LH2, HL2, and HH2 generated via the discrete wavelet transformer 5105, coefficient multiplexer 5106, and discrete wavelet transformer 5107, thus generating code sequences. A method of segmenting coefficients of respective subbands into blocks and individually encoding them to allow easy random access is known. However, in this embodiment, coefficients are encoded for respective subbands for the sake of simplicity. The coefficient values C(S, x, y) of respective subbands are encoded by expressing the absolute values of the coefficient values C(S, x, y) in each subband by natural binary values, and executing binary arithmetic coding from the upper to lower digits while giving priority to the bit plane direction. In the following description, Cn(S, x, y) represents a bit at the n-th digit position from the LSB when the coefficient value C(S, x, y) of each subband is expressed by a natural binary number. Note that variable n indicating the digit of a binary value is called a bit plane number, and bit plane number n has the LSB at the 0-th digit position.

Since the flow of the encoding process of subband S by the bit plane encoder 5108 is the same as that described using the flow chart of FIG. 6, a description thereof will be omitted. Note that an arithmetic encoder (not shown) in the bit plane encoder 5108 is initialized at the beginning of encoding of each bit plane, and undergoes a termination process at the end of the process. The generated code sequences are sent to the code sequence forming unit 5109, and are temporarily stored in the RAM 1002.

If the bit plane encoder 5108 has encoded the coefficients of all subbands and all code sequences are stored in the RAM 1002, the code sequence forming unit 5109 reads out the code sequences stored in the RAM 1002 in a predetermined order, inserts required additional to form a final code sequence as the output of the encoding apparatus of this embodiment, and outputs that code sequence to the code output unit 5110.

The final code sequence generated by the code sequence forming unit 5109 consists of a header and encoded data hierarchized in three levels 0, 1, and 2. The encoded data of level 0 consists of code sequences CS(LL, $N_{BP}$(LL)−1) to CS(LL, 0) obtained by encoding the coefficients of LL subband. The encoded data of level 1 consists of code sequences CS(LH1, $N_{BP}$(LH1)−1) to CS(LH1, 0), CS(HL1, $N_{BP}$(HL1)−1) to CS(HL1, 0), and CS(HH1, $N_{BP}$(HH1)−1) to CS(HH1, 0) obtained by encoding the coefficients of LH1, HL1, and HH1 subbands. The encoded data of level 2 consists of code sequences CS(LH2, $N_{BP}$(LH2)−1) to CS(LH2, 0), CS(HL2, $N_{BP}$(HL2)−1) to CS(HL2, 0), and CS(HH2, $N_{BP}$(HH2)−1) to CS(HH2, 0) obtained by encoding the coefficients of LH2, HL2, and HH2 subbands. The structure of the code sequence generated by the code sequence forming unit 5109 is as shown in FIG. 3.

The code output unit 5110 outputs the code sequence generated by the code sequence forming unit 5109 outside the apparatus. The code output unit 5110 includes, e.g., a function of a storage device such as the storage medium drive 1010, external storage device 1004, or the like, and a function of a network interface or the like.

As described above, image data is separately scanned as high- and low-resolution images, and the low-resolution image is multiplexed in the low-frequency subband obtained by decomposing the high-resolution image into subbands upon encoding. Hence, only a required portion can be scanned and encoded at a high resolution.

FIFTH EMBODIMENT

Figure 14:
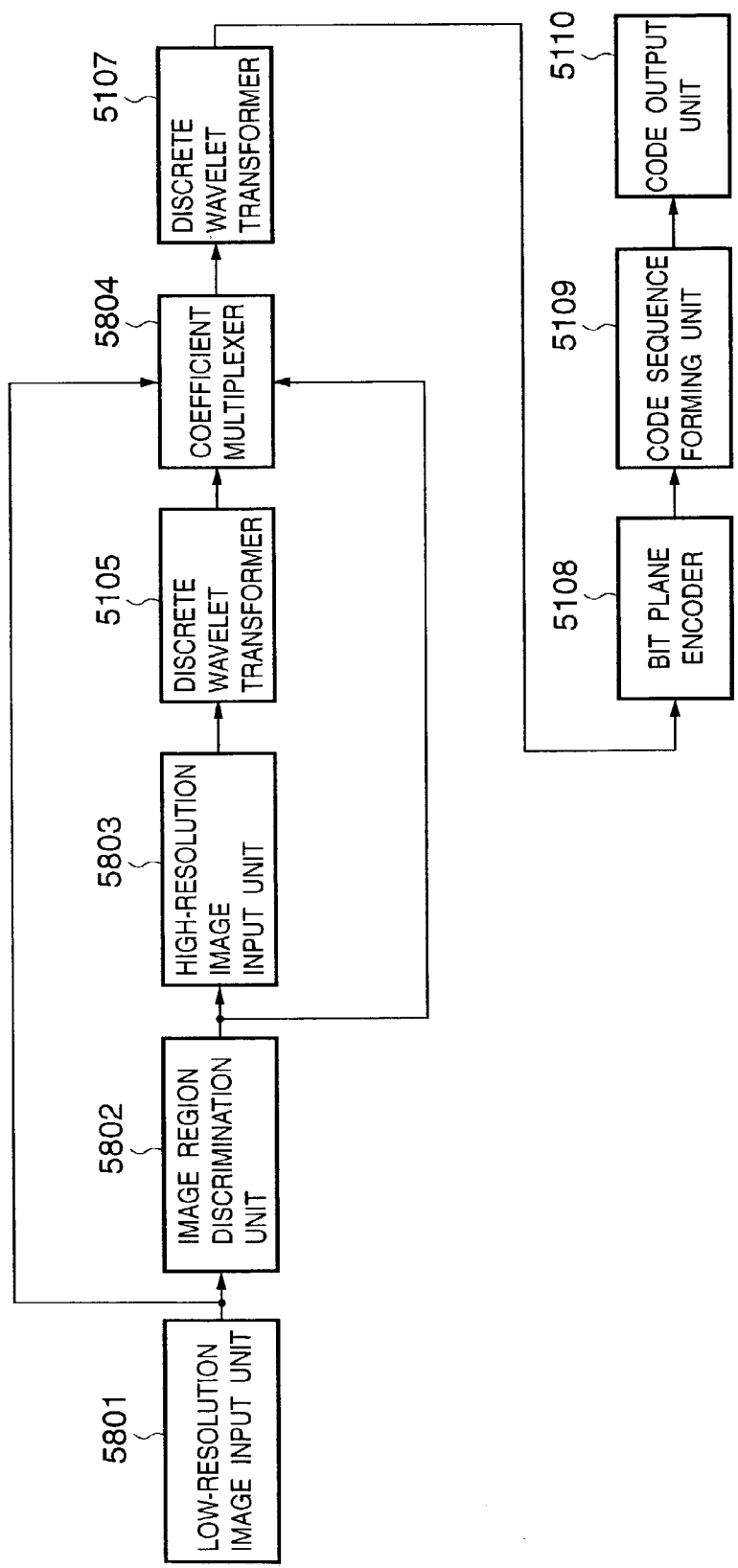
FIG. 14 is a block diagram showing the functional arrangement of an image encoding apparatus according to the fifth embodiment of the present invention.

FIG. 14 shows the functional arrangement of an image encoding apparatus according to this embodiment. Note that the same reference numerals in FIG. 14 denote the same parts as in FIG. 11 used in the fourth embodiment, and a description thereof will be omitted. Also, the basic arrangement of the image encoding apparatus of this embodiment is the same as that shown in FIG. 10.

Referring to FIG. 14, reference numeral 5801 denotes a low-resolution image input unit; 5802, an image region discrimination unit; 5803, a high-resolution image input unit; and 5804, a coefficient multiplexer.

In the description of this embodiment, assume that a monochrome document is scanned as image data in which the luminance value of each pixel is expressed by 8 bits, and that image data is to be encoded, as in the fourth embodiment. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data. In this embodiment, as in the fourth embodiment, a monochrome document to be encoded is scanned at a predetermined resolution, and the scanned image data is encoded. In this case, only a portion of the document can be scanned at a resolution twice the predetermined resolution in both the horizontal and vertical directions. The predetermined resolution will be referred to as a low resolution, and the resolution twice the predetermined resolution in both the horizontal and vertical directions will be referred to as a high resolution hereinafter. Assume that the size of a monochrome document is fixed, and X and Y represent the image size obtained when the entire document is scanned at the high resolution. Also, both X and Y are multiples of 4.

The functions and operations of respective units of the image encoding apparatus according to this embodiment will be described below using FIG. 14.

The low-resolution image input unit 5801 scans the entire monochrome document to be encoded at a half resolution (e.g., scans every other pixels in both the horizontal and vertical directions) to generate Pl(lx, ly). Note that lx ranges from 0 to (X/2−1), and ly ranges from 0 to (Y/2−1).

The image region discrimination unit 5802 detects a text/line image region from the low-resolution image Pl(lx, ly) input from the low-resolution image input unit 5801, and generates resolution flags Fl(lx, ly). Each resolution flag Fl(lx, ly) indicates if each pixel of the low-resolution image Pl(lx, ly) is included in a portion determined to be a text/line image region. If Pl(lx, ly) is included in the text/line image region, Fl(lx, ly) is set to be 1; otherwise, Fl(lx, ly) is set to be 0. In this embodiment, a practical method of text/line image region discrimination in the image region discrimination unit 5802 is not particularly limited.

The high-resolution image input unit 5803 scans the monochrome document at the resolution of the original image with reference to the resolution flags Fl(lx, ly) generated by the image region discrimination unit 5802, thus generating high-resolution image data Ph (x, y). At a position (x, y) where the resolution flag Fl(floor{x/2}, floor{y/2})=0, an actual scan operation is skipped, and Ph(x, y)=0 is set. Note that x ranges from 0 to (X−1), and y ranges from 0 to (Y−1).

The discrete wavelet transformer 5105 decomposes the pixel data Ph(x, y) of the high-resolution image data input from the high-resolution image input unit 5803 into subbands as in the fourth embodiment, thus generating coefficients C(S, x, y) (S is one of LL, LH, HL, and HH) of respective subbands.

Upon completion of subband decomposition of the high-resolution image in the discrete wavelet transformer 5105, the coefficient multiplexer 5804 multiplexes low-frequency subband C(LL, x, y) generated by the discrete wavelet transformer 5105, and the low-resolution image Pl(lx, ly) with reference to the resolution flags Fl(lx, ly) generated by the image region discrimination unit 5802. Since low-frequency subband C(LL, x, y) has the same size as the low-resolution image Pl(lx, ly), the multiplexing process in the coefficient multiplexer 5804 will be explained while replacing variables x and y that represent coordinate positions in the subband by lx and ly. The coefficient multiplexer 5804 checks the resolution flags Fl(lx, ly) of all coefficients of C(LL, lx, ly) in the raster scan order, and replaces C(LL, lx, ly) by Pl(lx, ly) if Fl(lx, ly)=0.

After that, the encoding process from the discrete wavelet transformer 5107 to the code output unit 5110 is the same as that in the fourth embodiment.

As described above, image data is separately scanned as high- and low-resolution images, and the low-resolution image is multiplexed in the low-frequency subband obtained by decomposing the high-resolution image into subbands upon encoding. Hence, only a required portion can be scanned and encoded at a high resolution. In this embodiment, since a document is temporarily scanned at a low resolution, a region that requires a high resolution can be selectively scanned.

SIXTH EMBODIMENT

Figure 15:
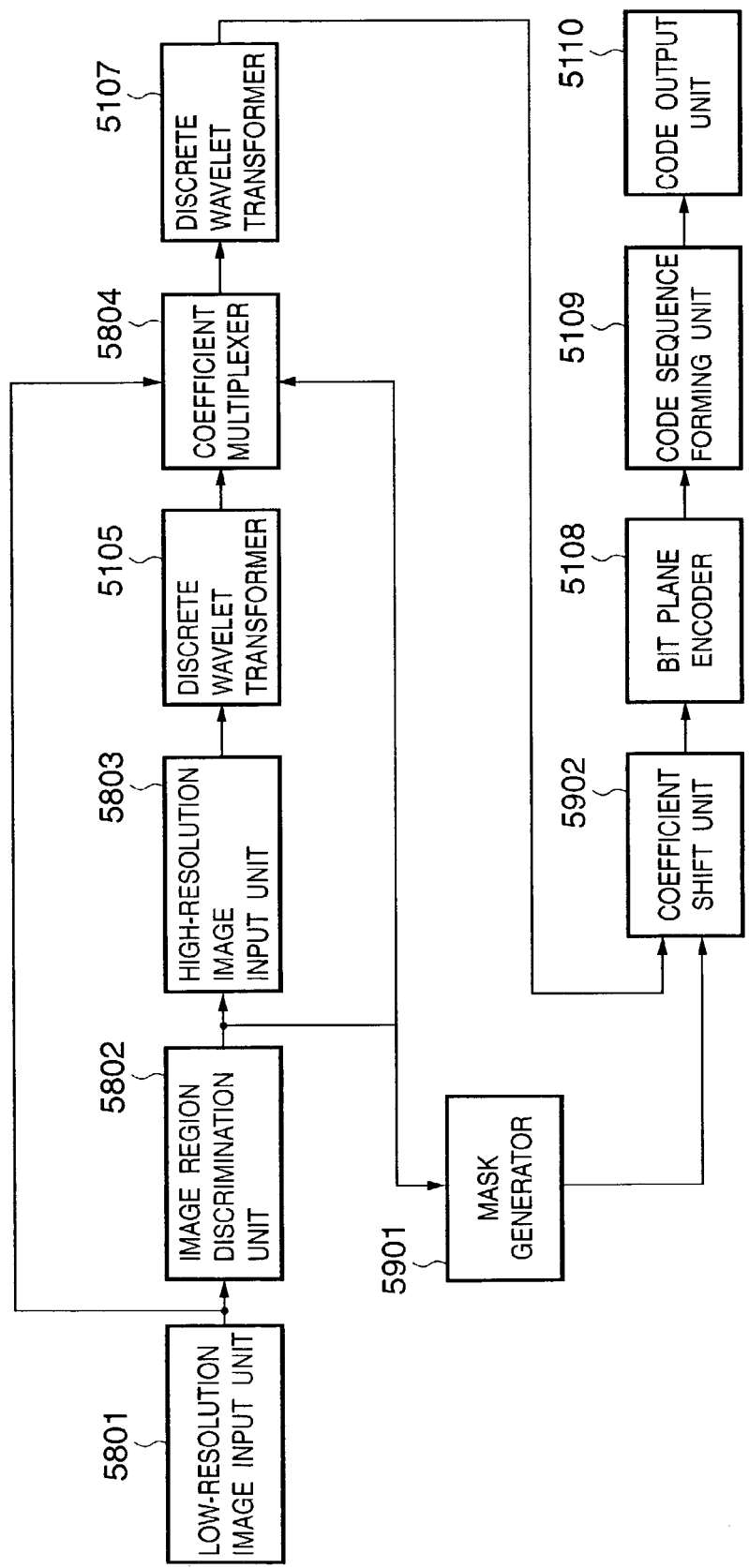
FIG. 15 is a block diagram showing the functional arrangement of an image encoding apparatus according to the sixth embodiment of the present invention.

FIG. 15 shows the functional arrangement of an image encoding apparatus according to this embodiment. Note that the same reference numerals in FIG. 15 denote the same parts as in FIG. 11 used in the fourth embodiment and in FIG. 14 used in the fifth embodiment, and a description thereof will be omitted. Also, the basic arrangement of the image encoding apparatus of this embodiment is the same as that shown in FIG. 10.

Referring to FIG. 15, reference numeral 5901 denotes a mask generator; and 5902, a coefficient shift unit.

In the description of this embodiment, assume that a monochrome document is scanned as image data in which the luminance value of each pixel is expressed by 8 bits, and that image data is to be encoded, as in the fourth and fifth embodiments. However, the present invention is not limited to such specific data, but can be applied to image data in which the luminance value is expressed by the number of bits other than 8 bits (e.g., 4 bits, 10 bits, 12 bits, or the like). Also, the present invention can be applied to color image data in which each pixel is expressed by a plurality of color components such as RGB, CMYK, or the like or by luminance and chromaticity/color difference components such as YCrCb, or the like. In such case, each component in color image data can be considered as monochrome image data. In this embodiment, as in the fourth embodiment, a monochrome document to be encoded is scanned at a predetermined resolution, and the scanned image data is encoded. In this case, only a portion of the document can be scanned at a resolution twice the predetermined resolution in both the horizontal and vertical directions. The predetermined resolution will be referred to as a low resolution, and the resolution twice the predetermined resolution in both the horizontal and vertical directions will be referred to as a high resolution hereinafter. Assume that the size of a monochrome document is fixed, and X and Y represent the image size obtained when the entire document is scanned at the high resolution. Also, both X and Y are multiples of 4.

The functions and operations of respective units of the image encoding apparatus according to this embodiment will be described below using FIG. 15.

Since the image encoding apparatus of this embodiment is obtained by adding the mask generator 5901 and coefficient shift unit 5902 to that of the fifth embodiment, and the functions and operations of other units are the same as those in the fifth embodiment, the operations of only the added mask generator 5901 and coefficient shift unit 5902 will be explained.

The mask generator 5901 generates and outputs mask information $M(x, y)$ indicating if coefficients $C(LL, x, y)$, $C(LH1, x, y)$, $C(HL1, x, y)$, and $C(HH, x, y)$ of subbands obtained by decomposing $C(LL, x, y)$ obtained by the coefficient multiplexer 5804 into subbands are associated with the high-resolution image $Ph(x, y)$, with reference to the resolution flags $Fl(lx, ly)$ generated by the image region discrimination unit 5802. The mask information has a size half that of the information of the resolution flags. If one of $Fl(2 \times x, 2 \times y)$, $Fl(2 \times x+1, 2 \times y)$, $Fl(2 \times x, 2 \times y+1)$, and $Fl(2 \times x+1, 2 \times y+1)$ is 1, $M(x, y)=1$; if all of them are zero, $M(x, y)=0$.

The coefficient shift unit 5902 obtains a maximum value Nmax of the numbers of effective bits of respective subbands, refers to the mask information $M(x, y)$ generated by the mask generator 5901 in association with coefficient values $C(S, x, y)$ of LL, LH1, HL1, and HH1 subbands, and shifts up by Nmax bits a coefficient $C(S, x, y)$ of each subband if $M(x, y)=1$. Hence, upon referring to the coefficients of all the subbands, coefficients each of which has a number of effective bits equal to or larger than Nmax can be considered as those corresponding to $M(x, y)=1$, thus specifying a high-resolution region earlier.

After that, the processes up to the code output unit 5110 are the same as those in the fourth and fifth embodiments. In this embodiment, however, upon inserting additional information in encoded data by the code sequence forming unit 5109, the number Nmax of bits, which are shifted up by the coefficient shift unit 5902, is inserted in the header.

In this embodiment, the receiving side of the code sequence can decode text/line image information earlier in addition to the effect described in the fifth embodiment.

<Modification>

The present invention is not limited to the aforementioned embodiments. For example, in the fourth to sixth embodiments described above, encoding using discrete wavelet transformation given by equations (5) and (6) has been exemplified. However, discrete wavelet transformation is not limited to that used in the above embodiments, and the types of filters and adaptive method may be changed. For example, a filter having a large number of taps, e.g., a 9/7 filter may be used instead, and two-dimensional discrete wavelet transformation may be repetitively applied to subbands other than the low-frequency subband. In this case, the filter influence range must be taken into consideration in the coefficient multiplexing process.

The bit plane encoding method using QM-Coder has been exemplified as the coefficient encoding method. However, the present invention is not limited to the above embodiments. For example, arithmetic coding methods such as MQ-Coder and the like other than QM-Coder may be applied, and other binary coding methods such as MEL-CODE and the like may be applied. Also, a bit plane may be categorized into a plurality of sub-bit planes in accordance with the state of coefficients near the coefficient of interest, and may be encoded in a plurality of passes. Furthermore, Golomb coding may be applied to directly execute entropy-coding of multi-valued coefficients without decomposing them into binary data.

In the above embodiments, bit plane encoding for respective subbands has been explained for the sake of simplicity. However, each subband may be further segmented into small blocks, and bit plane encoding may be applied to each small block, so as to allow easy random access.

Upon forming the code sequence, the receiving side can reconstruct an image while gradually increasing the resolution. However, the present invention is not limited to this. For example, a code sequence may be formed by arranging coefficients in descending order of values so as to gradually improve the image quality.

Note that the present invention may be applied to either a system constituted by a plurality of devices (e.g., a host computer, interface device, reader, printer, and the like), or an apparatus consisting of a single equipment (e.g., a copying machine, facsimile apparatus, digital camera, or the like).

Also, the present invention is not limited to the system and method alone for implementing the aforementioned embodiments, but the scope of the present invention includes a case wherein the above embodiments are achieved by supplying a program code of software that can implement the functions of the above-mentioned embodiments to a computer (or a CPU or MPU) in a system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the present invention.

As the storage medium for storing such program code, for example, a floppy disk, hard disk, optical disk, magneto-optical disk, CD-ROM, magnetic tape, nonvolatile memory card, ROM, and the like may be used.

The program is included in the scope of the embodiments not only when the functions of the above embodiments are implemented by controlling various devices according to the supplied program code alone but also when the functions of the embodiments are implemented by collaboration of the program and an OS (operating system) or another application software running on the computer.

Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

With the above description, upon encoding image data that contains regions which require different resolution levels, the present invention can achieve efficient image encoding. Also, encoding that generates a code sequence with which the resolution region of interest can be specified early upon decoding the encoded image data can be made.

As many apparently widely different embodiments of the present invention can be made without departing from the spirit and scope thereof, it is to be understood that the invention is not limited to the specific embodiments thereof except as defined in the appended claims.

What is claimed is:

1. An image encoding apparatus for encoding an image, comprising:
    region information generation means for generating region information which indicates a region of the image, that requires decoding at a higher resolution than other regions;
    frequency transformation means for generating coefficients for respective subbands by frequency transformation of the image;
    correction means for correcting, in accordance with the region information, coefficients which form a subband included in a predetermined high-frequency component of the subbands generated by said frequency transformation means or quantized values of the coefficients; and
    encoding means for encoding the coefficients or quantized values of the coefficients, including those corrected coefficients by said correction means to generate a code sequence.

2. The apparatus according to claim 1, wherein the region that requires decoding at the higher resolution than other regions includes a text region.

3. The apparatus according to claim 1, wherein said correction means generates, based on the region information, mask information indicating if the coefficients which form the subband included in the predetermined high-frequency component, or the quantized values of the coefficients are included in the region that requires decoding at the higher resolution than other regions, and corrects the coefficients or the quantized values of the coefficients in accordance with the mask information.

4. The apparatus according to claim 3, wherein said correction means generates the mask information for respective subbands included in the predetermined high-frequency component.

5. The apparatus according to claim 1, wherein when the coefficients which form the subband included in the predetermined high-frequency component, or the quantized values of the coefficients are not included in the region that requires decoding at the higher resolution than other regions, said correction means corrects the coefficients or the quantized values of the coefficients.

6. The apparatus according to claim 5, wherein when the coefficients which form the subband included in the predetermined high-frequency component, or the quantized values of the coefficients are not included in the region that requires decoding at the higher resolution than other regions, said correction means corrects the coefficients or the quantized values of the coefficients to zero.

7. The apparatus according to claim 1, wherein said frequency transformation means utilizes discrete wavelet transforms.

8. An image encoding apparatus for encoding an image, comprising:
    division means for dividing the image into tiles each having a predetermined size;
    frequency transformation means for generating coefficients for respective subbands of a tile, divided by said division means, by frequency transformation of the tile;
    discrimination means for generating a discrimination result indicating if each of the tiles divided by said division means includes a specific region;
    correction means for correcting, in accordance with the discrimination result of said discrimination means, coefficients which form a subband included in a predetermined high-frequency component of the subbands generated by said frequency transformation means or quantized values of the coefficients; and
    encoding means for encoding the coefficients or quantized values of the coefficients, including those corrected coefficients by said correction means to generate a code sequence.

9. The apparatus according to claim 8, wherein the specific region includes a text region.

10. The apparatus according to claim 8, wherein said discrimination means generates the discrimination result on the basis of an operator's instruction that indicates the specific region.

11. The apparatus according to claim 8, wherein said discrimination means obtains edge information of the tiles, and generates the discrimination result based on the edge information.

12. The apparatus according to claim 8, wherein when the coefficients which form the subband included in the predetermined high-frequency component, or the quantized values of the coefficients are not included in the specific region, said correction means corrects the coefficients or the quantized values of the coefficients.

13. The apparatus according to claim 12, wherein when the coefficients which form the subband included in the predetermined high-frequency component, or the quantized values of the coefficients are not included in the specific region, said correction means corrects the coefficients or the quantized values of the coefficients to zero.

14. The apparatus according to claim 8, wherein said frequency transformation means utilizes discrete wavelet transforms.

15. An image encoding apparatus for encoding an image, comprising:
    division means for dividing the image into tiles each having a predetermined size;
    discrimination means for generating a discrimination result indicating if each of the tiles divided by said division means includes a specific region;
    frequency transformation means for generating coefficients for respective subbands of a tile, divided by said division means, by frequency transform of the tile using a filter according to the discrimination result of said discrimination means;
    correction means for correcting, in accordance with the discrimination result of said discrimination means, coefficients which form a subband included in a predetermined high-frequency component of the subbands generated by said frequency transformation means or quantized values of the coefficients; and encoding means for encoding the coefficients or quantized values of the coefficients, including those corrected coefficients by said correction means to generate a code sequence.

16. The apparatus according to claim 15, wherein the code sequence includes the discrimination results for respective tiles.

17. An image encoding method for encoding an image, comprising:

a region information generation step, of generating region information which indicates a region of the image, that requires decoding at a higher resolution than other regions;

a frequency transformation step, of generating coefficients for respective subband by frequency transformation of the image;

a correction step, of correcting, in accordance with the region information, coefficients which form a subband included in a predetermined high-frequency component of the subbands generated in said frequency transformation step or quantized values of the coefficients; and an encoding step, of encoding the coefficients or quantized values of the coefficients, including those corrected coefficients in said correction step to generate a code sequence.

18. A computer-readable medium storing a program which, when executed, performs the image encoding method of claim 17.

19. An image encoding method for encoding an image, comprising:

a division step, of dividing the image into tiles each having a predetermined size;

a frequency transformation step, of generating coefficients for respective subbands of a tile, divided in said division step, by frequency transformation of the tile;

a discrimination step, of generating a discrimination result indicating if each of the tiles divided in said division step includes a specific region;

a correction step, of correcting, in accordance with the discrimination result of said discrimination step, coefficients which form a subband included in a predetermined high-frequency component of the subbands generated in said frequency transformation step or quantized values of the coefficients; and an encoding step, of encoding the coefficients or quantized values of the coefficients, including those corrected coefficients in said correction step to generate a code sequence.

20. A computer-readable medium storing a program which, when executed, performs the image encoding method of claim 19.

21. An image encoding method for encoding an image, comprising:

a division step, of dividing the image into tiles each having a predetermined size;

a discrimination step, of generating a discrimination result indicating if each of the tiles divided in said division step includes a specific region;

a frequency transformation step, of generating coefficients for respective subbands of a tile, divided in said division step, by frequency transform of the tile using a filter according to the discrimination result of said discrimination step;

a correction step, of correcting, in accordance with the discrimination result of said discrimination step, coefficients which form a subband included in a predetermined high-frequency component of the subbands generated in said frequency transformation step or quantized values of the coefficients; and an encoding step, of encoding the coefficients or quantized values of the coefficients, including those corrected coefficients in said correction step to generate a code sequence.

22. A computer-readable medium storing a program which, when executed, performs the image encoding method of claim 21.

23. An image encoding apparatus for encoding an image, comprising:

first scan means for scanning a first region of an original image at a first resolution to generate a first image including the scanned region;

second scan means for scanning a second region different from the first region at a second resolution higher than the first resolution to generate a second image including the scanned region;

first frequency transformation means for generating coefficients for respective subbands, by frequency transformation of the second image;

multiplexing means for multiplexing the first image in a predetermined one of a plurality of subbands obtained by said first frequency transformation means to generate a multiplexed subband;

second frequency transformation means for further generating coefficients for respective subbands, by frequency transformation of the multiplexed subband; and code sequence generation means for generating a code sequence on the basis of the coefficients of the subbands obtained by said first and second frequency transformation means.

24. The apparatus according to claim 23, further comprising flag generation means for generating a flag used to designate a region to be scanned by said second scan means.

25. The apparatus according to claim 24, wherein said first scan means scans a region other than the region to be scanned by said second scan means at the first resolution with reference to the flag to generate the first image.

26. The apparatus according to claim 23, wherein a size of the first image is equal to a size of the predetermined subband.

27. The apparatus according to claim 23, wherein the first resolution is half the second resolution.

28. The apparatus according to claim 24, wherein said multiplexing means specifies coefficients of the predetermined subband, which are included in a region corresponding to the first region, using the flag, and replaces the specified coefficients by the first image.

29. The apparatus according to claim 23, further comprising flag generation means for generating a flag which indicates a predetermined region in the first image.

30. The apparatus according to claim 29, wherein the predetermined region is a text/line image region.

31. The apparatus according to claim 29, wherein said second scan means scans the predetermined region in the original image at the second resolution with reference to the flag to generate the second image.

32. The apparatus according to claim 29, wherein a size of the first image is equal to a size of the predetermined subband.

33. The apparatus according to claim 29, wherein the first resolution is half the second resolution.

34. The apparatus according to claim 29, wherein said multiplexing means specifies coefficients of the predetermined subband, which are included in a region corresponding to the first region, using the flag, and replaces the specified coefficients by the first image.

35. The apparatus according to claim 29, further comprising mask generation means for generating a mask which indicates coefficients, associated with the second image, of the coefficients which form subbands generated upon computing the frequency transforms of the multiplexed subband by said code sequence generation means.

36. The apparatus according to claim 35, wherein said mask generation means specifies the coefficients associated with the second image using the flag.

37. The apparatus according to claim 23, wherein said code sequence generation means obtains a maximum value of the numbers of effective bits contained in the respective subbands generated by said code sequence generation means, and shifts up the coefficients associated with the second image by bits corresponding to the maximum value.

38. The apparatus according to claim 37, wherein the code sequence contains the maximum value.

39. The apparatus according to claim 23, wherein said first and second frequency transformation means utilizes discrete wavelet transforms.

40. The apparatus according to claim 23, wherein the predetermined subband is an LL subband.

41. An image encoding method for encoding an image, comprising:
   a first scan step, of scanning a first region of an original image at a first resolution to generate a first image including the scanned region;
   a second scan step, of scanning a second region different from the first region at a second resolution higher than the first resolution to generate a second image including the scanned region;
   a first frequency transformation step, of generating coefficients for respective subbands, by frequency transformation of the second image;
   a multiplexing step, of multiplexing the first image in a predetermined one of a plurality of subbands obtained in said first frequency transformation step to generate a multiplexed subband;
   a second frequency transformation step, of further generating coefficients for respective subbands, by frequency transformation of the multiplexed subband; and
   a code sequence generation step, of generating a code sequence on the basis of the coefficients of the subbands obtained in said first and second frequency transformation steps.

42. The method according to claim 41, further comprising a flag generation step, of generating a flag used to designate a region to be scanned in said second scan step.

43. The method according to claim 41, further comprising a flag generation step, of generating a flag which indicates a predetermined region in the first image.

44. The method according to claim 43, further comprising a mask generation step, of generating a mask which indicates coefficients, associated with the second image, of the coefficients which form subbands generated upon computing the frequency transforms of the multiplexed subband in said code sequence generation step.

45. A computer-readable medium storing a program which, when executed, performs the image encoding method of claim 41.

* * * * *

UNITED STATES PATENT AND TRADEMARK OFFICE
CERTIFICATE OF CORRECTION

PATENT NO. : 7,013,050 B2  
APPLICATION NO. : 10/176583  
DATED : March 14, 2006  
INVENTOR(S) : Hiroshi Kajiwara Page 1 of 1

It is certified that error appears in the above-identified patent and that said Letters Patent is hereby corrected as shown below:

Column 10

Line 54, "NBP(HL2)-1)" should read --$N_{BP}$(HL2)-1)--.

Column 13

Line 19, "NBP(HL1)-1" should read --$N_{BP}$(HL1)-1--; and "NBP(HH1)-1" should read --$N_{BP}$(HH1)-1--.

Signed and Sealed this

Twenty-eighth Day of November, 2006

JON W. DUDAS  
*Director of the United States Patent and Trademark Office*